(12) United States Patent
Kuroki et al.

(10) Patent No.: US 7,287,621 B2
(45) Date of Patent: Oct. 30, 2007

(54) VEHICULAR POWER TRANSMISSION MECHANISM

(75) Inventors: Masahiro Kuroki, Saitama (JP); Shinji Takayanagi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 376 days.

(21) Appl. No.: 10/715,481

(22) Filed: Nov. 19, 2003

(65) Prior Publication Data

US 2004/0144591 A1    Jul. 29, 2004

(30) Foreign Application Priority Data

Dec. 20, 2002  (JP)  ............................. 2002-369447
Dec. 25, 2002  (JP)  ............................. 2002-373676

(51) Int. Cl.
*B60K 17/04*   (2006.01)
*B60K 17/22*   (2006.01)

(52) U.S. Cl. ............... 180/374; 180/210; 280/124.107; 475/222

(58) Field of Classification Search ............... 180/374, 180/375, 337, 210, 215; 280/124.103, 124.13, 280/124.156, 124.107, 124.138, 124.162, 280/124.179, 124.157; 475/200, 220, 222, 475/251

See application file for complete search history.

(56) References Cited

U.S. PATENT DOCUMENTS

| | | | |
|---|---|---|---|
| 3,598,385 A * | 8/1971 | Parsons, Jr. ................... 267/30 |
| 3,938,609 A | 2/1976 | Kensaku et al. |
| 4,313,518 A | 2/1982 | Ledwinka et al. |
| 4,360,224 A * | 11/1982 | Sato et al. ................... 280/269 |
| 4,470,611 A * | 9/1984 | Duphily et al. ............. 280/104 |
| 4,546,997 A * | 10/1985 | Smyers .................... 280/5.509 |
| 4,560,026 A | 12/1985 | Yanagisawa |
| 4,690,235 A | 9/1987 | Miyakoshi |
| 4,873,879 A * | 10/1989 | Butterfield et al. ......... 475/200 |
| 4,974,693 A * | 12/1990 | Nakai et al. ............... 180/19.3 |
| 5,108,126 A | 4/1992 | Banse |
| 5,156,070 A * | 10/1992 | Fukuda et al. ............ 74/606 R |
| 5,364,114 A * | 11/1994 | Petersen ............... 280/124.151 |
| 5,558,361 A * | 9/1996 | Shin ....................... 280/124.15 |
| 6,286,619 B1 * | 9/2001 | Uchiyama et al. .......... 180/337 |

(Continued)

FOREIGN PATENT DOCUMENTS

DE    21 37 757 A    2/1973

(Continued)

*Primary Examiner*—Paul N. Dickson
*Assistant Examiner*—George D. Spisich
(74) *Attorney, Agent, or Firm*—Birch, Stewart, Kolasch & Birch, LLP

(57) ABSTRACT

In a three-wheeled vehicle provided with a power transmission mechanism for transmitting the output of an engine to left and right rear wheels via a continuously variable transmission, a gear box and inner shafts of drive shafts as left and right output shafts, the inner shafts which are output shafts of the gear box are provided apart in a longitudinal direction of the body. The overall length of the drive shafts can be increased. When the rear wheel is vertically moved, an angle of the bend of the drive shaft can be minimized. Further, the tread of the wheels can be reduced. Therefore, the width of the body can be reduced and the mobility of the vehicle can be enhanced. In addition, the gear case can be separate from the crankcase and attached to the crankcase with the differential mechanism being housed in the separate gear case.

20 Claims, 25 Drawing Sheets

U.S. PATENT DOCUMENTS 6,386,619 B1 * 5/2002 Tsuchida ................ 296/146.9

FOREIGN PATENT DOCUMENTS

| DE | 200 17 449 U1 | 12/2000 |
| EP | 0 626 307 A1 | 11/1994 |
| EP | 1 020 350 A | 7/2000 |
| EP | 1 378 427 A1 | 1/2004 |
| EP | 1 378 428 A1 | 1/2004 |
| FR | 2 680 733 A | 3/1993 |
| GB | 1 240 506 | 7/1971 |
| GB | 1 240 506 A | 7/1971 |
| JP | 58-156473 A | 9/1983 |
| JP | 59 073370 A | 4/1984 |

* cited by examiner (a)

(b)

(c)

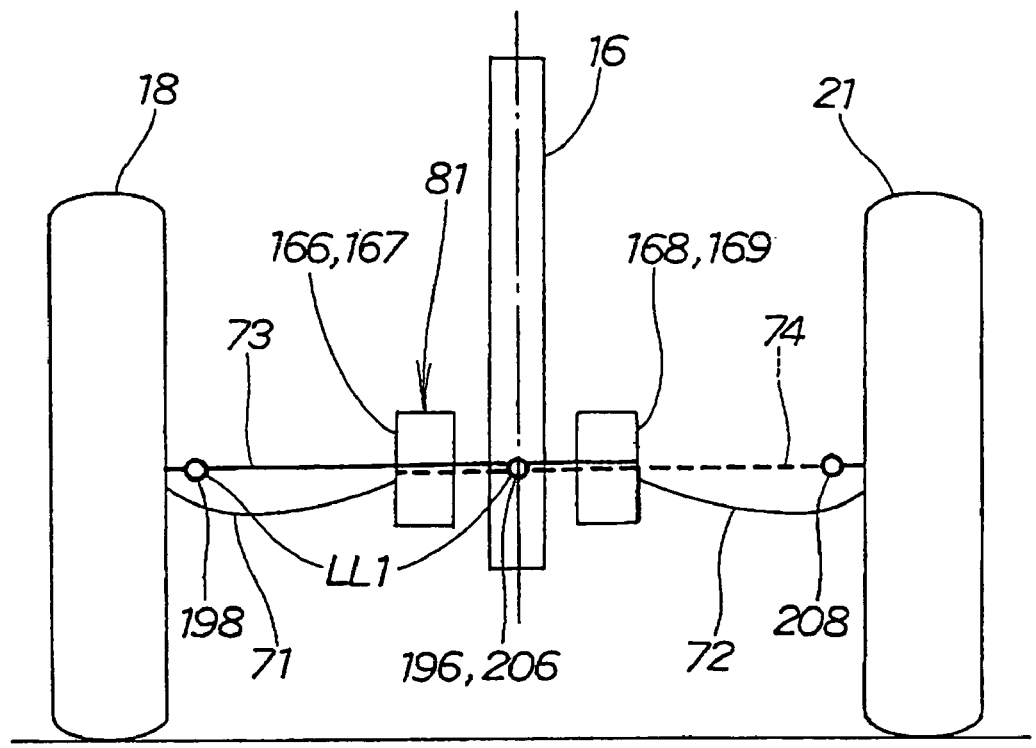
FIG. 20(a) Embodiment
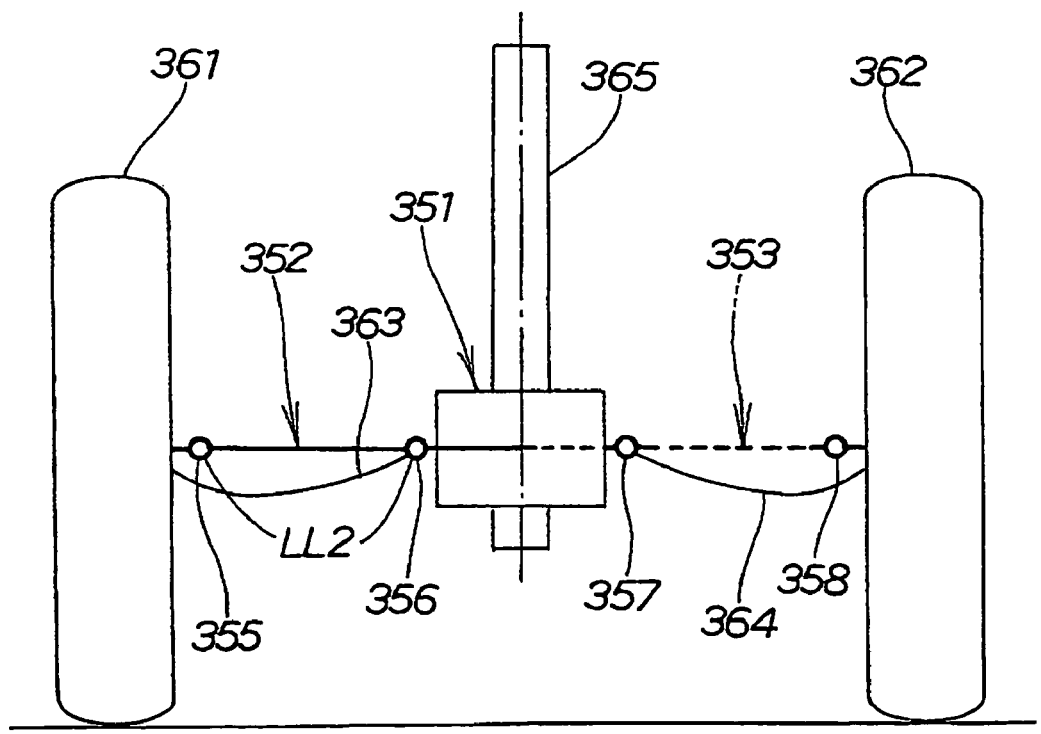
FIG. 20(b) Comparison example

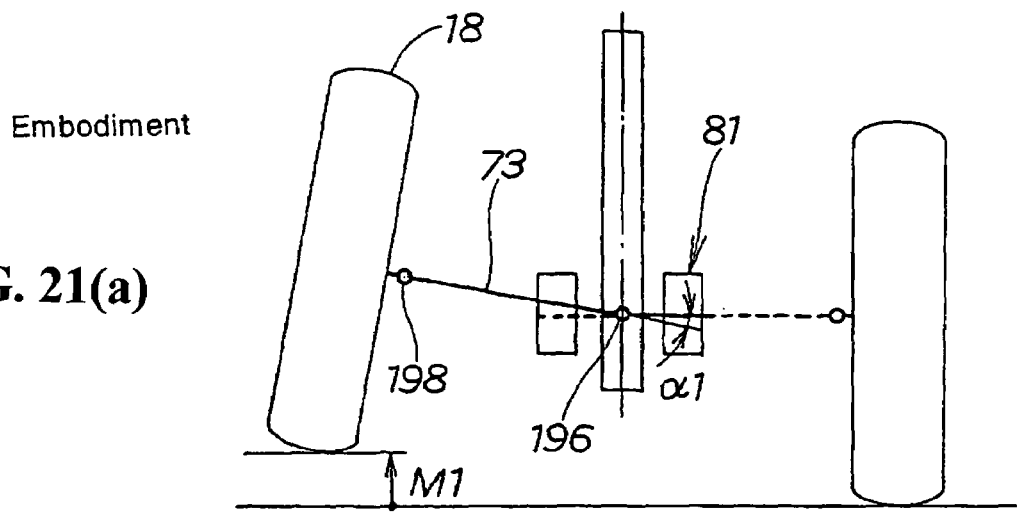
FIG. 21(a) Embodiment
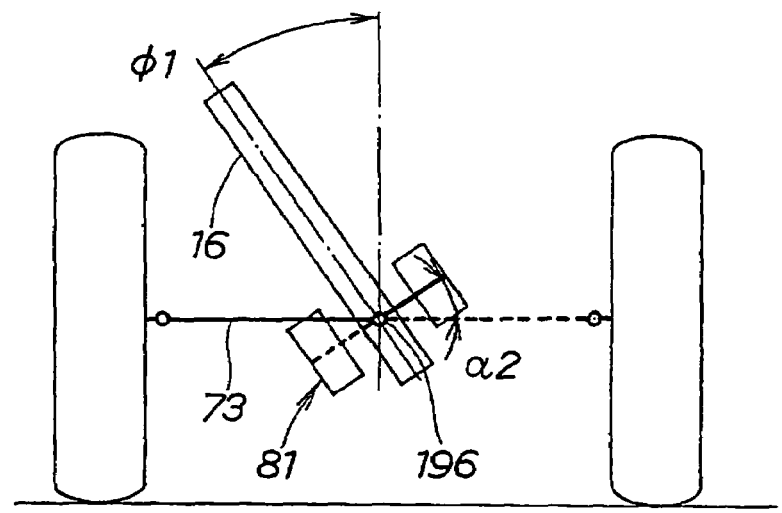
FIG. 21(b)
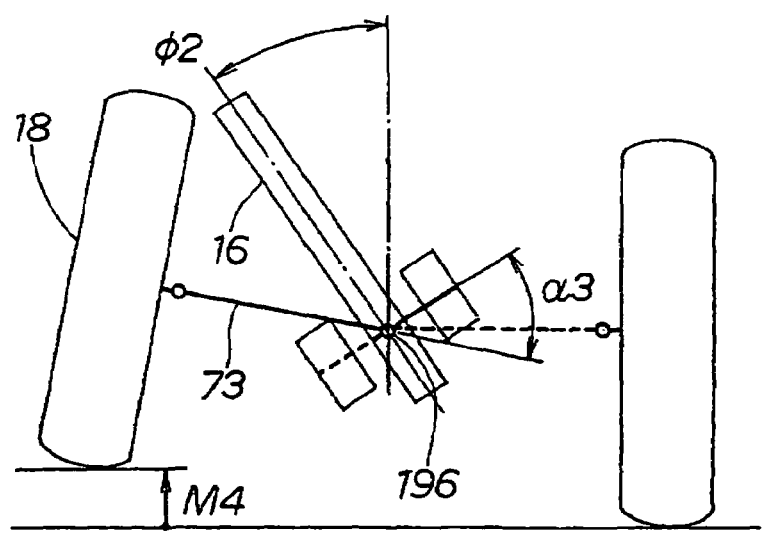
FIG. 21(c)

VEHICULAR POWER TRANSMISSION MECHANISM

CROSS-REFERENCE TO RELATED APPLICATIONS

The present application claims priority under 35 USC 119 to Japanese Patent Application No. 2002-369447 filed on Dec. 20, 2002 and Japanese Patent Application No. 2002-373676 filed on Dec. 25, 2002 and the entire contents thereof are hereby incorporated by reference.

BACKGROUND OF THE INVENTION

1. Field of the Invention

The present invention relates to a vehicular power transmission mechanism suitable for reducing the tread of rear wheels, keeping an angle of the bend of a drive shaft so that the angle is a predetermined angle or less. In addition, the present invention relates to a vehicular power transmission mechanism which is easily applied to another vehicle and wherein the cost of which can be reduced.

2. Description of Background Art

A power transmission mechanism for a vehicle is known wherein a power transmission mechanism includes concentric right and left axles extending from differential gears to both sides of the body with rear wheels that are attached to each end of the right and left axles, for example, see Japanese Utility Model No. Sho 63-21445 (second page, FIG. 3) and Japanese Utility Model No. Sho 59-106723 (fourth and fifth pages, FIG. 3).

FIG. 23 of the present specification corresponds to FIG. 3 of Japanese Utility Model No. Sho 63-21445 which will be described below. However, please note that the reference numbers are changed as compared to the original Japanese document.

FIG. 23 is a plan view showing a power transmission mechanism of a conventional type vehicle wherein the vehicle includes rear wheels 307, 307 that are driven by transmitting the output of an engine 301 to differential gears 304 via chains 302, 303 and attaching the rear wheels 307, 307 to the respective ends of rear axles 305, 306 extending to the right and the left from the differential gears 304.

Referring to FIG. 24 in the present specification, which corresponds to FIG. 3 of Japanese Utility Model No. Sho 59-106723, will be described below. However, again reference numbers are newly allocated.

FIG. 24 is a sectional view showing a power transmission mechanism of a conventional type vehicle wherein the vehicle includes a belt automatic transmission 312 that is coupled to an engine 311, differential gears 314 housed in a rear axle 313 are coupled to the belt automatic transmission 312 via a gear and a chain, rear axles 316, 316 are attached to the right and the left of the differential gears 314 and rear wheels 317, 317 are attached to these rear axles 316, 316.

In the vehicle shown in FIG. 23, the rear axles 305, 306 extend laterally from both sides of the differential gears 304 and are coupled to the rear wheels 307, 307. In case the right and left rear wheels 307, 307 are of an independent suspension type in such arrangement, they are attached to the sides of the body, respectively, via a suspension arm so that they can be vertically moved and a drive shaft provided with a constant-velocity universal joint, for example, is used for the rear axles 305, 306.

The drive shaft can transmit driving force to the rear wheels 307, 307 even if the rear wheels 307, 307 are vertically moved. However, an angle of the bend of the constant-velocity universal joint of the drive shaft is required to be a predetermined angle or less. Therefore, when the overall length of the drive shaft is short, it is difficult to reduce the angle of the bend. To keep an angle of the bend of the drive shaft at a predetermined angle or less, the overall length of the drive shaft is required to be increased. As a result, the center distance of right and left rear wheels, that is, tread (horizontal distance between the centers of the contact surfaces of the tread of right and left tires with a road surface) is increased, the width of the body is increased and the realization of keeping the angle of the bend at a predetermined angle or less is difficult in a small-sized vehicle. It damages the mobility of the vehicle to keep the angle of the bend at a predetermined angle or less. It is also similar in the vehicle shown in FIG. 24.

In addition, a vehicular power transmission mechanism in which a transmission and a differential mechanism are housed in a crankcase of an engine is known, for example, as set forth in Japanese Published Examined Patent Application No. Hei5-39998 (second page, FIG. 2).

Referring to FIG. 25 of the present specification, which corresponds to FIG. 2 of Japanese Published Examined Patent Application No. Hei5-39998, a description is set forth below. Note, that the reference numbers used for FIG. 25 are newly allocated as compared to Japanese Published Examined Patent Application No. Hei5-39998.

FIG. 25 is a sectional view showing a power transmission mechanism of a conventional type vehicle wherein a transmission mechanism 304 is coupled to a crankshaft 302 of an engine 301 via a V belt 303. A differential mechanism 306 is coupled to the transmission mechanism 304, left and right driving shafts 307, 308 are coupled to the differential mechanism 306, a rear wheel (not shown) is coupled to the driving shafts 307, 308 and the transmission mechanism 304 and the differential mechanism 306 are housed in the crankcase 311 of the engine 301.

In the above-mentioned prior art, as the transmission mechanism 304 and the differential mechanism 306 are housed in the crankcase 311 of the engine 301, that is, a case for housing the transmission mechanism 304 and the differential mechanism 306 and the crankcase 311 are integrated, a degree of the freedom of changes decreases when the gear ratio of the transmission mechanism 304 is maintained and the specifications (a cylinder bore diameter and a piston stroke) of the engine are to be changed or when the specifications of the engine 301 are maintained and the gear ratio of the transmission mechanism 304 is to be changed (the diameter of a transmission gear is changed). In the case when the power transmission mechanism is applied in another vehicle and applicable vehicles are limited. As a result, the power transmission mechanism is substantially dedicated and it is difficult to reduce the cost.

SUMMARY AND OBJECTS OF THE INVENTION

It is an object of the invention is to improve a power transmission mechanism of a vehicle and to reduce the tread of rear wheels, keeping an angle of the bend of a drive shaft at a predetermined angle or less.

To achieve the present invention the right and left output shafts of a reduction gear are provided apart in a longitudinal direction of the body in a vehicle provided with a power transmission mechanism that transmits the output of an engine to right and left wheels via a transmission, the reduction gear and the right and left output shafts.

For example, the right and left output shafts of the reduction gear are directly provided to the right and the left of the reduction gear, a drive shaft extends right and left from these output shafts, the right and left output shafts are provided apart in a longitudinal direction of the body in the invention, compared with a case wherein a wheel is coupled to each end of these drive shafts, the overall length of the drive shaft can be increased if the drive shafts extend diagonally from the right and left output shafts to the side of the wheel and when the rear wheel is vertically moved, an angle of the bend of the drive shaft can be minimized. Further, as the drive shaft diagonally extends even if the overall length is large, the tread of the wheels can be reduced.

The present invention provides a differential mechanism that is built in a reduction gear and the differential mechanism is arranged between right and left output shafts.

Two shafts on the output side of the differential mechanism can be easily connected to the right and left output shafts via a gear and others.

It is an object of the present invention to improve a vehicular power transmission mechanism, to enable an easy application of the power transmission mechanism to another vehicle and to greatly reduce the cost of the power transmission mechanism.

To achieve this object, the present invention provides a case separate from a crankcase that is attached to the crankcase and a differential mechanism is housed in the separate case in a vehicle in which a transmission is housed in the crankcase of an engine and the output shaft of the transmission is coupled to right and left rear wheels via the differential mechanism.

For example, a differential mechanism for a three-wheeled vehicle or a four-wheeled vehicle can be coupled to a unit of an engine and a transmission, respectively, for a motorcycle by attaching the case separate from the crankcase to the crankcase for housing the transmission and housing the differential mechanism in the separate case and the power transmission mechanism can be easily applied. In addition, in the case wherein a speed reducing mechanism, for example, is housed together with the differential mechanism in the case, the speed reducing ratio of a speed reducing mechanism for a three-wheeled vehicle or a four-wheeled vehicle can be freely set according to a type, applying the engine and the transmission for a motorcycle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 20(a) and 20(b) are back views for comparing the overall length of drive shafts;

FIGS. 21(a) to 21(c) are explanatory drawings for explaining the action of drive shafts in an embodiment according to the invention;

DETAILED DESCRIPTION OF THE PREFERRED EMBODIMENTS

Figure 1:
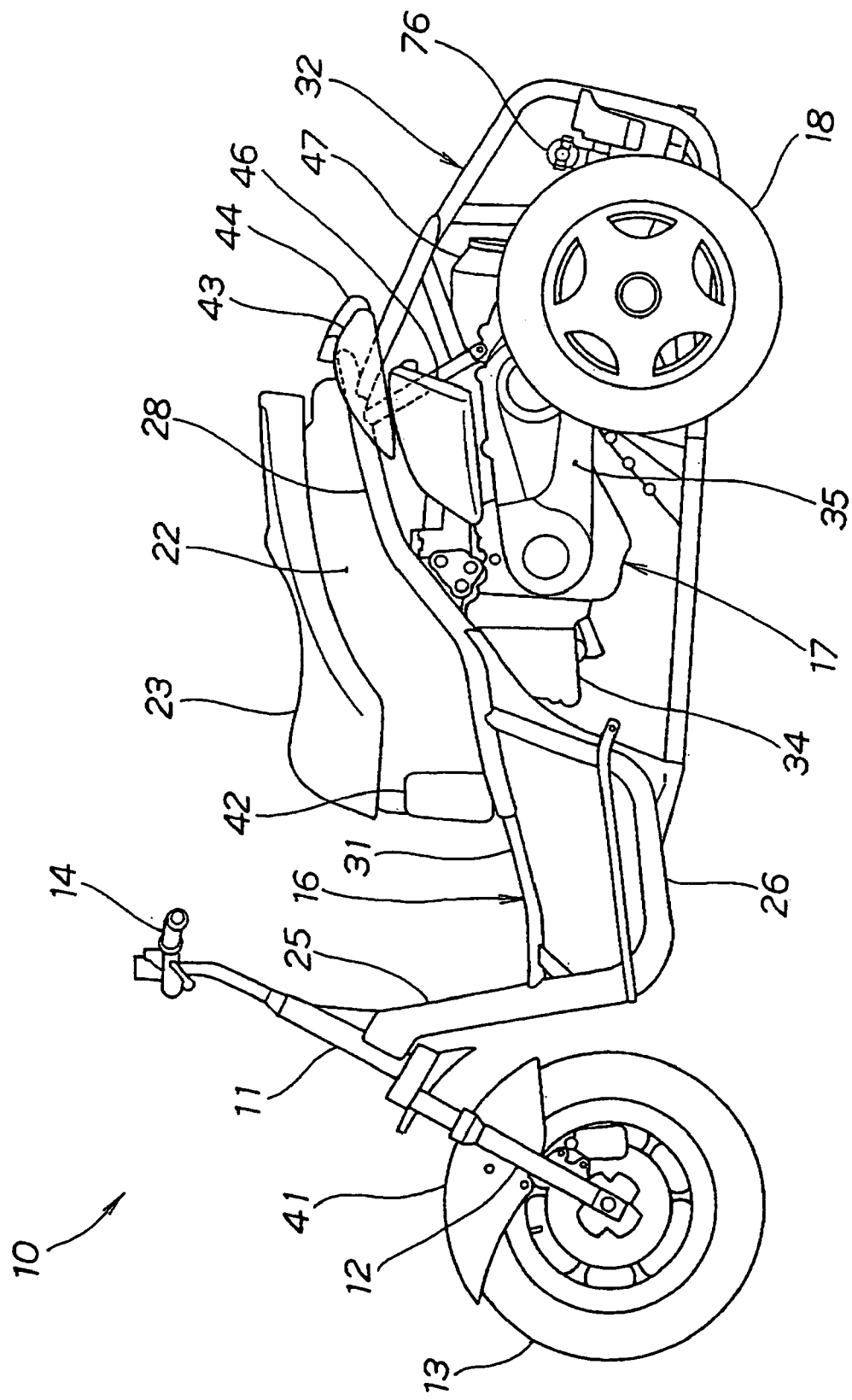
FIG. 1 is a side view showing a three-wheeled vehicle provided with a swinging mechanism according to the invention.

FIG. 1 is a side view showing a three-wheeled vehicle provided with a swinging mechanism according to the present invention. The three-wheeled vehicle provided with the swinging mechanism 10, hereinafter referred to as the three-wheeled vehicle 10, is composed of a front fork 12 attached to a head pipe 11 so that the front fork can be steered via a handlebar shaft not shown. A front wheel 13 is attached to the lower end of the front fork 12 with a handlebar 14 integrated with the front fork 12. A body frame 16 is attached to the rear of the head pipe 11 with a power unit 17 attached to the rear of the body frame 16. Rear wheels 18, 21 (the rear wheel 21 on the inner side is not shown) are provided as left and right wheels driven by the power unit 17. A housing box 22 is attached to the upside of the body frame 17 and a seat 23 is openably attached to the upside of the housing box 22.

The body frame 16 is composed of a down pipe 25 extending rearwardly and diagonally downwardly from the head pipe 11. A pair of left and right lower pipes 26, 27 (the lower pipe 27 on the inner side is not shown) extend rearwardly from the lower part of the down pipe 25 and further, rearwardly and diagonally upwardly with a center upper frame 28 coupled to each rear of these lower pipes 26, 27. A center pipe 31 extends rearwardly from the down pipe 25 and is coupled to the center upper frame 28 with a J frame 32 coupled to each of the rear of the lower pipes 26, 27 and respective parts on the rear side of the center upper frame 28 and being J-shaped when the J frame is viewed from the side.

The center upper frame 28 is a member for supporting the housing box 22 and suspending the power unit 17.

The J frame 32 is a member for attaching a rear suspension that suspends the rear wheels 18, 21 and the swinging mechanism that allows right and left oscillation on the side of the body frame 16 for the side of the rear suspension. The rear suspension and the swinging mechanism will be described in detail later.

The power unit 17 is composed of an engine 34 arranged on the front side of the body and a power transmission mechanism 35 that transmits the power of the engine 34 to the rear wheels 18, 21.

A front fender 41 covers the upside of the front wheel 13 with a battery 42, a winker 43, a tail lamp 44, an air cleaner 46 and 47 denotes a muffler 47 being operatively attached to the body frame.

Figure 2:
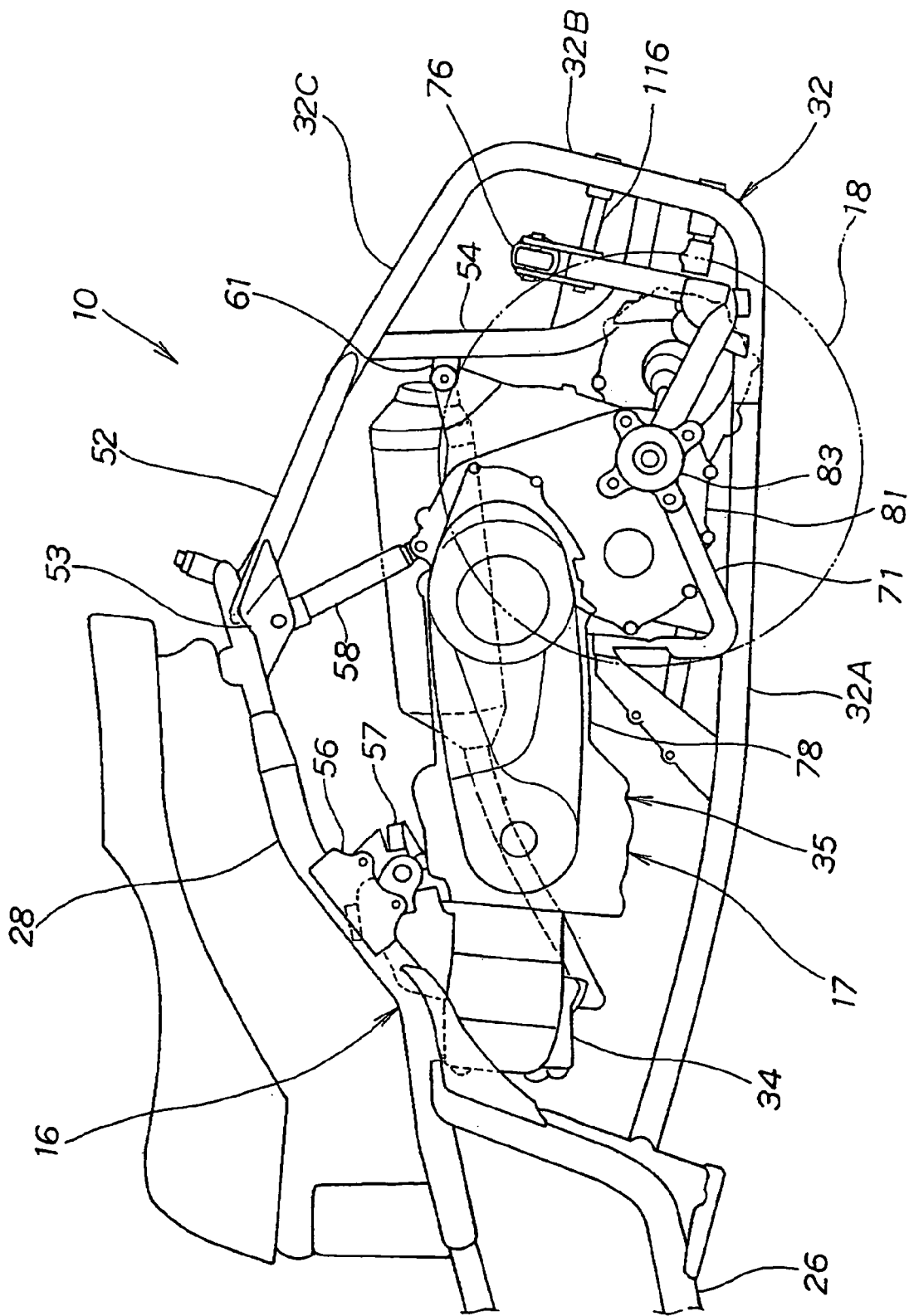
FIG. 2 is a side view showing a main part of the three-wheeled vehicle according to the invention.

FIG. 2 is a side view showing a main part of the three-wheeled vehicle according to the present invention. FIG. 2 shows that coupling pipes 52, 52 (the coupling pipe 52 on the inner side is not shown) are placed between the J frame 32 and the center upper frame 28 to couple the upside of the J frame 32 and the rear end of the center upper frame 28 with each reinforcing plate 53, 53 being attached to each coupling pipe 52, 52 and the center upper frame 28. An L pipe 54 of a substantially L shape when it is viewed from the side is attached to the inside of the rear of the J frame 32. Brackets 56, 56 (the bracket 56 on the inner side is not shown) are attached to the center upper frame 28 with the upside of the front of the power unit 17 being attached to the brackets 56, 56 via a junction member 57. The rear of the power unit 17 is supported by extending a supporting rod 58 downwardly and diagonally rearwardly from the reinforcing plates 53, 53 and the rear end of the power unit 17 is attached by extending a projection 61 forward from the front of the L pipe 54. A substantially horizontal lower horizontal part 32A of the J frame 32 is provided with a rear end inclined part 32B and the side of the upper end 32C which is located at the back of the side of the lower end and an upper inclined part the front end of which is located higher than the rear end.

Figure 3:
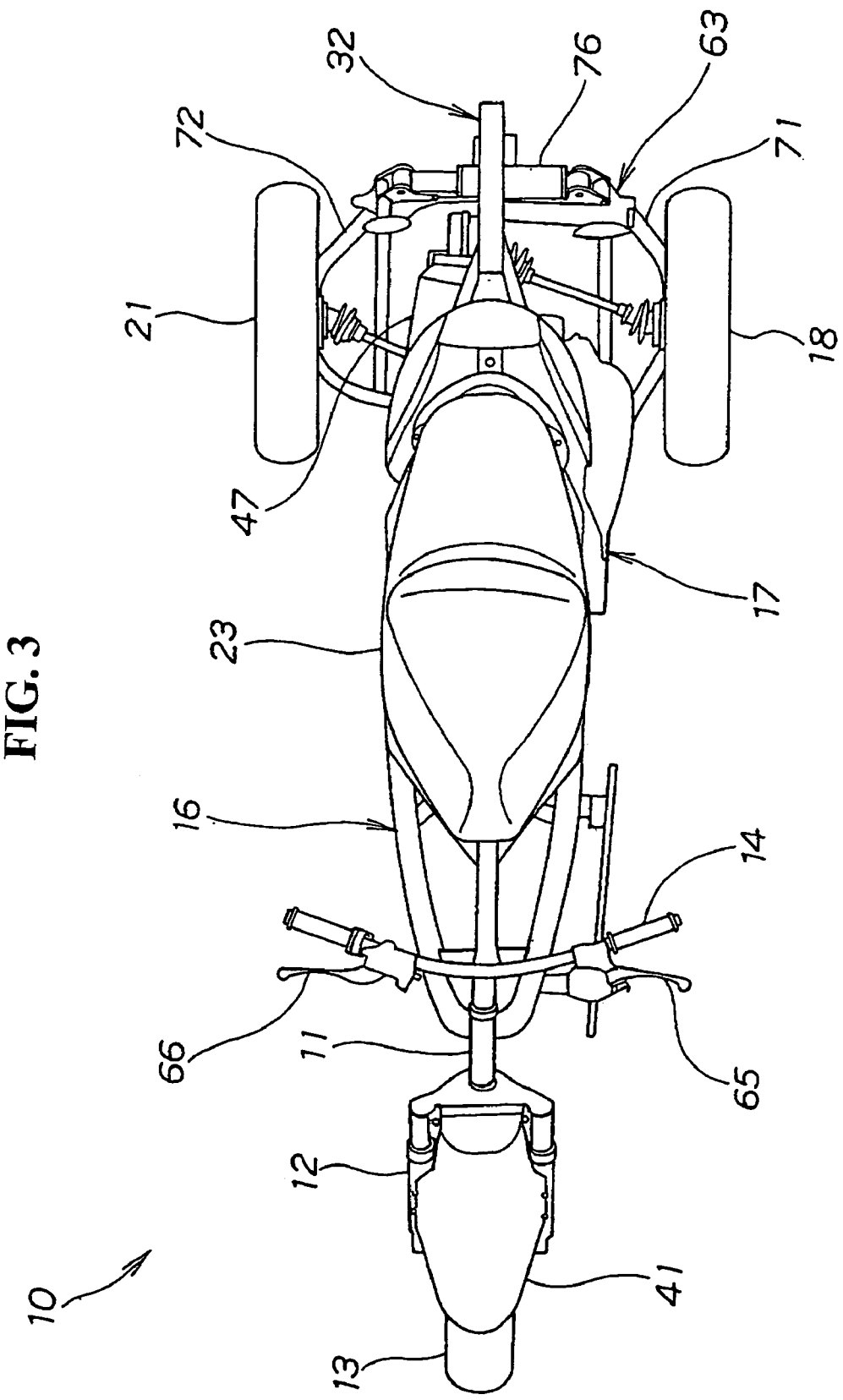
FIG. 3 is a plan showing the three-wheeled vehicle according to the invention.

FIG. 3 is a plan view showing the three-wheeled vehicle according to the present invention and illustrating that the rear of the J frame 32 is formed by one pipe and the rear suspension 63 (the details will be described later) is attached to the J frame 32. A brake lever 65 for the rear wheel and a brake lever 66 for the front wheel are operatively connected to the handlebars.

Figure 4:
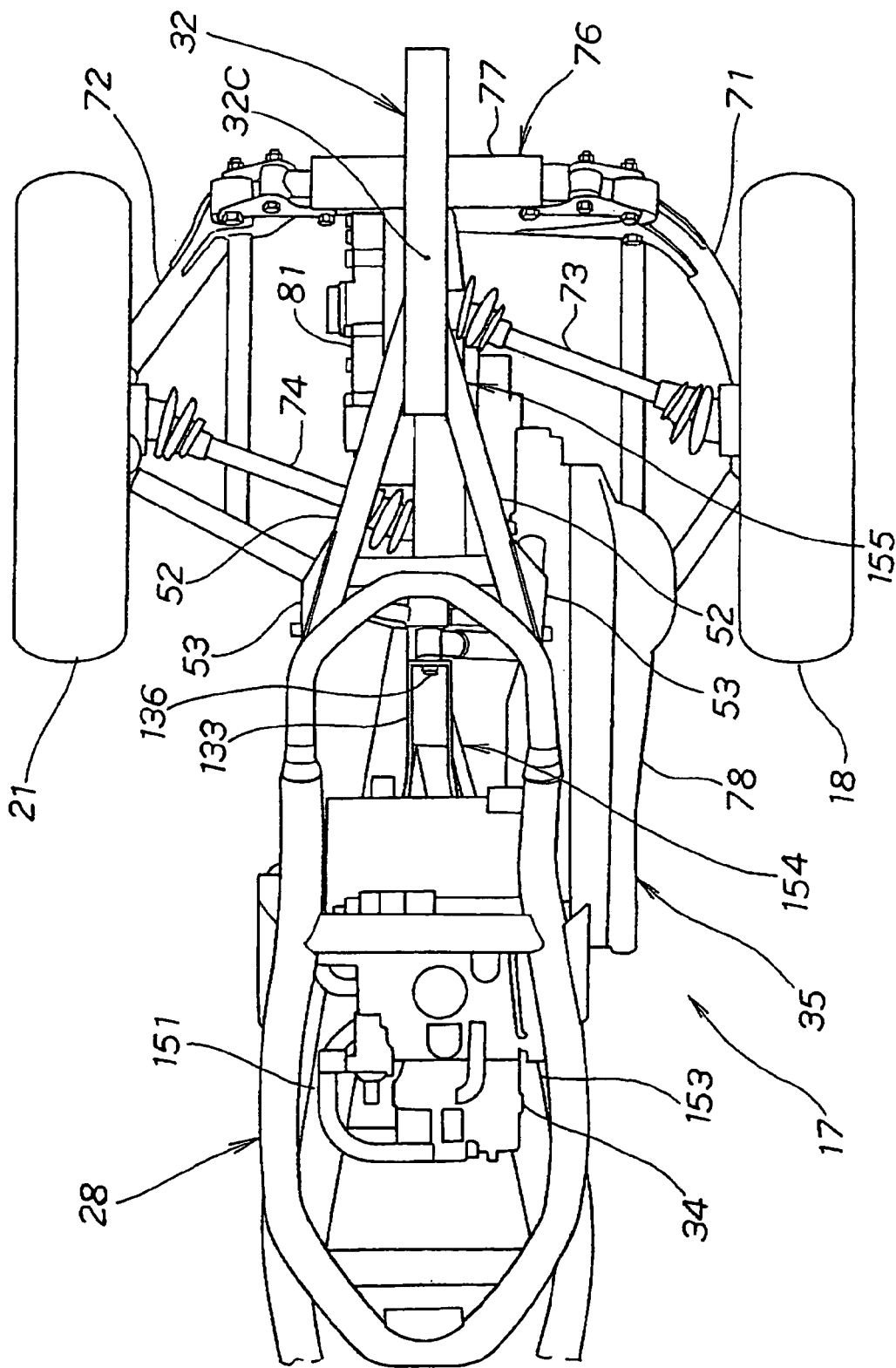
FIG. 4 is a plan showing the main part of the three-wheeled vehicle according to the invention.

FIG. 4 is a plan showing the main part of the three-wheeled vehicle according to the present invention and illustrating the structure wherein the suspension arms 71, 72 are attached to the right and the left of the J frame 32, a holder (not shown) is attached to each end of the these suspension arms 71, 72. The rear wheels 18, 21 are attached to these holders so that the rear wheels can be turned and the rear wheels 18, 21 are driven by the drive shafts 73, 74 forming the power transmission mechanism 35 of the power unit 17.

As illustrated in FIG. 4, a shock absorber 76 is provided as an elastic means composed of a damper 77 and a helical compression spring (not shown) and the shock absorber is coupled to the left and right suspension arms 71, 72.

The center upper frame 28 is a substantially elliptic member and the housing box 22 (see FIG. 1) is provided with a bottom having substantially the same form and is attached to the upside of the center upper frame 28.

The power transmission mechanism 35 of the power unit 17 is composed of a belt continuously variable transmission 78 extending rearwardly from the left rear of the engine 34, a gear box 81 as a reduction gear coupled to the rear of the continuously variable transmission 78, the drive shaft 74 connected to the output shaft on the front side of the gear box 81 and the drive shaft 73 connected to the output shaft on the rear side of the gear box 81.

Figure 5:
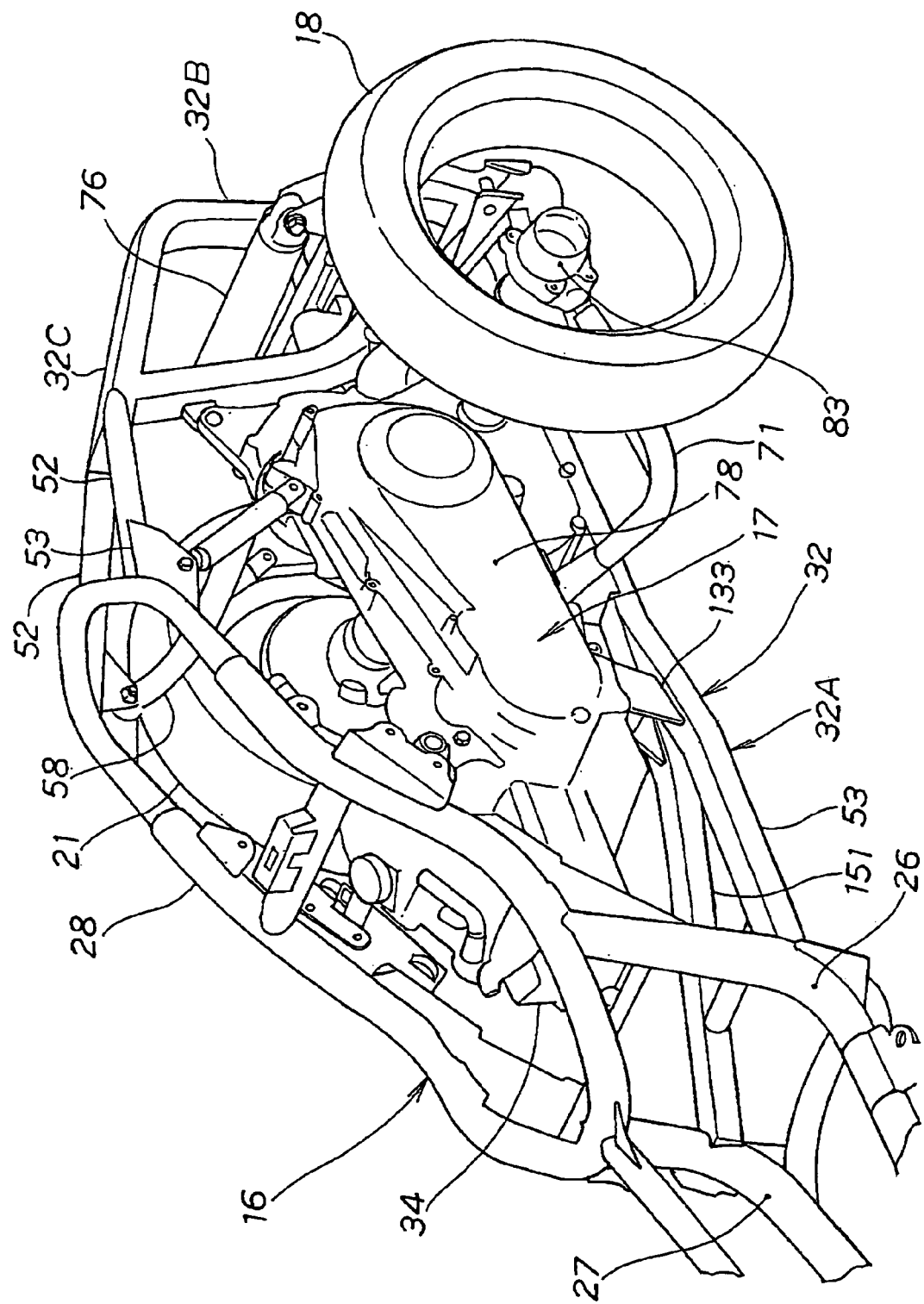
FIG. 5 is a first perspective view showing the three-wheeled vehicle according to the invention.

FIG. 5 is a perspective view showing the three-wheeled vehicle according to the present invention and illustrating that the front of the J frame 32 is attached to each rear of the lower pipes 26, 27 of the body frame 16. A holder 83 is provided for mounting the wheel (the holder 83 on the inner side is not shown).

Figure 6:
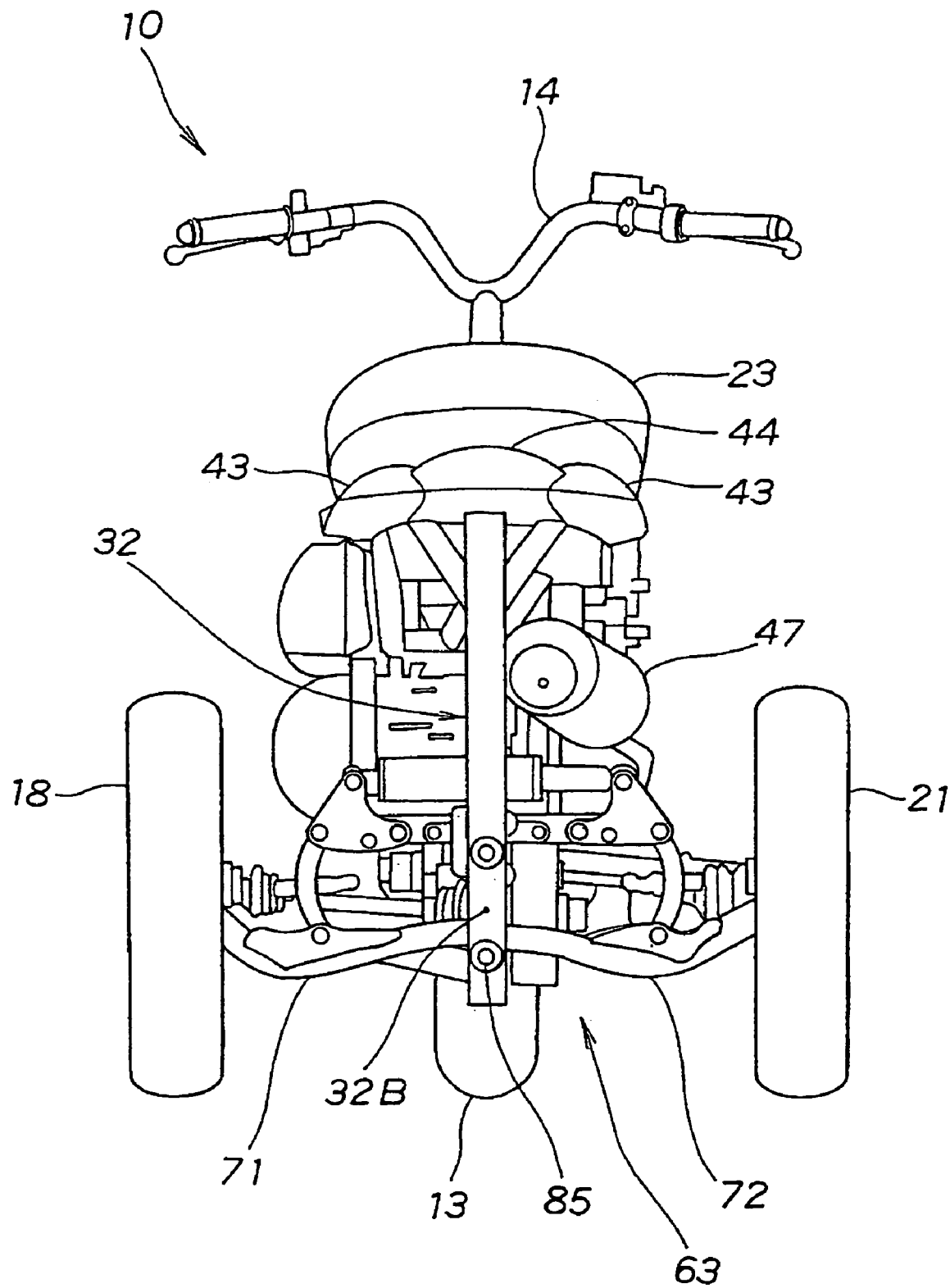
FIG. 6 is a back view showing the three-wheeled vehicle according to the invention.

FIG. 6 is a back view showing the three-wheeled vehicle according to the present invention, the rear end inclined part 32B of the J frame 32 is a substantially vertical part in a state in which nobody rides on the three-wheeled vehicle 10 and each rear portion of the suspension arms 71, 72 is attached to the rear end inclined part 32B. A rear swinging shaft 85 is provided for attaching each rear portion of the suspension arms 71, 72 to the rear end inclined part 32B so that the suspension arms can be swing.

Figure 7:
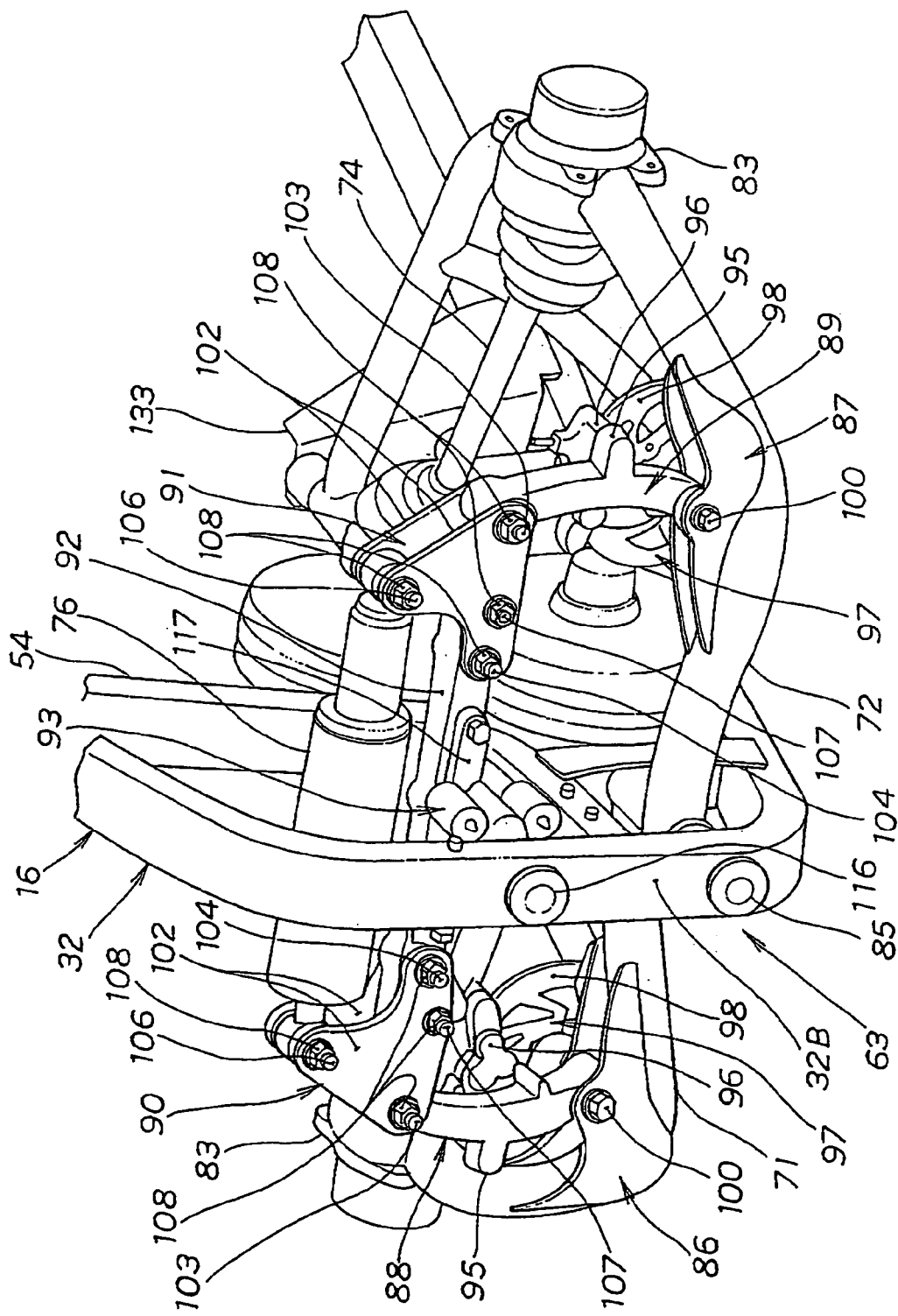
FIG. 7 is a second perspective view showing the three-wheeled vehicle according to the invention.

FIG. 7 is a perspective view showing the three-wheeled vehicle according to the present invention. FIG. 7 shows the rear suspension 63 in which the suspension arms 71, 72 extend laterally from the J frame 32, the holder 83 is attached to each end of these suspension arms 71, 72 with circular arc-shaped links 88, 89 attached to each upside of the suspension arms 71, 72 via brackets 86, 87 so that the circular arc-shaped links can be swing. Bell cranks 90, 91 of a substantially L type when the bell crank is viewed from the side are attached to each end of the circular arc-shaped links 88, 89 so that the bell crank can be swing. The shock absorber 76 is placed between the upper ends of these bell cranks 90, 91 with a bar-shaped connecting member 92 being positioned between the sides of the bell cranks 90, 91. The connecting member 92 is attached to the rear end inclined part 32B of the J frame 32 via a swinging mechanism 93.

The circular arc-shaped links 88, 89 are respectively provided with a side protruding part 95 at an intermediate part and brake calipers 96, 96 for braking the swing of the circular arc-shaped links 88, 89 are attached to the side protruding parts 95. A braking device 97, 97 is provided with the brake caliper 96 and each disc 98, 98 is held between the brake calipers 96, 96 by oil pressure. The discs 98, 98 are members attached to the suspension arms 71, 72. A bolt 100 functions as a swinging shaft of each circular arc-shaped link 88, 89.

Each bell crank 90, 91 is composed of two crank plates 102, 102 and is provided with a first bolt 103, a second bolt 104 and a third bolt 106. A fourth bolt 107 functions as a stopper pin for regulating the expansion and contraction of the shock absorber 76 and 108 denotes each nut to be screwed on the first bolt 103 to the fourth bolt 107.

The swinging mechanism 93 allows the left and right oscillation of the body frame 16 for the suspension arms 71, 72 in cornering for increasing reaction force with a built-in elastic body as the inclination of oscillation increases and restores to an original position.

Figure 8A:
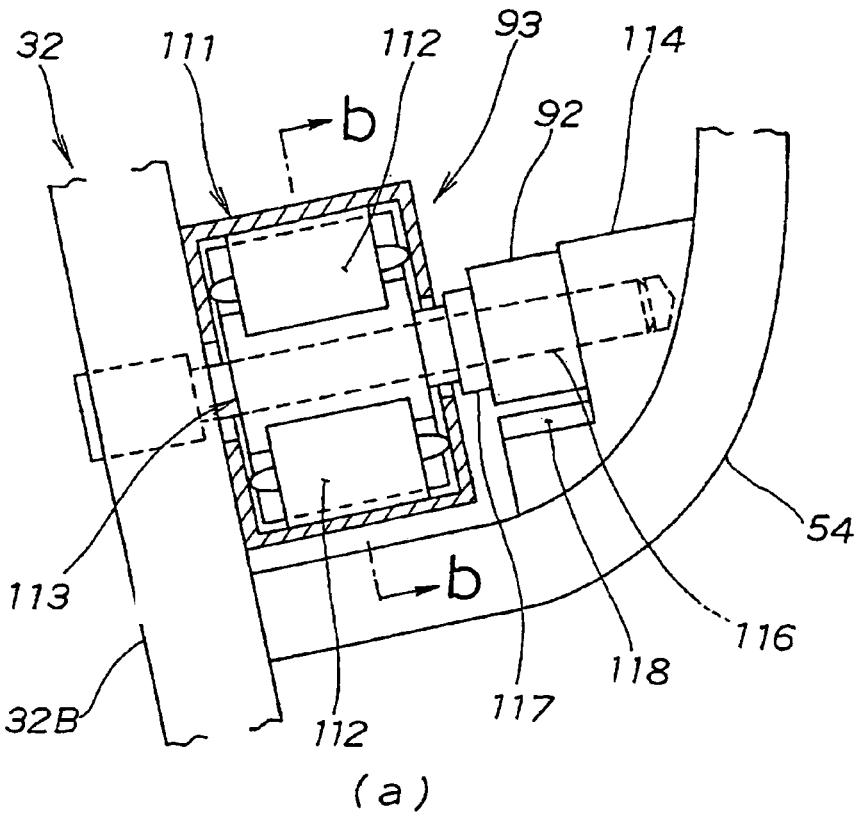
FIGS. 8(a) to 8(c) are explanatory drawings for explaining the swinging mechanism according to the invention.
Figure 8B:
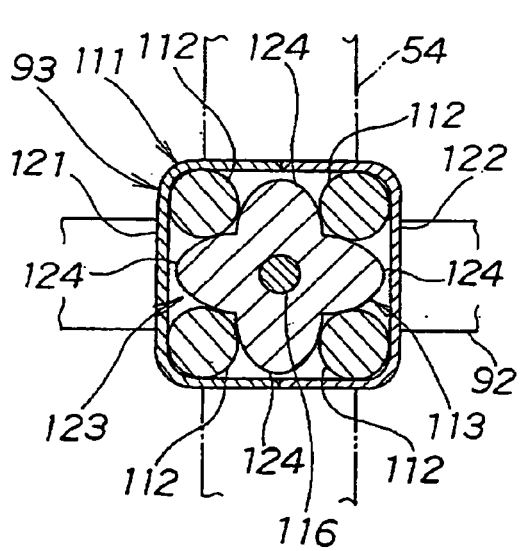
Figure 8C:
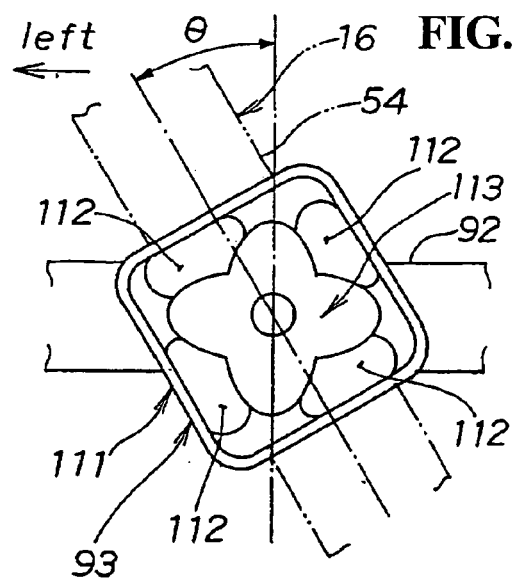

FIGS. 8(a) to 8(c) are explanatory drawings for explaining the swinging mechanism according to the present invention, wherein FIG. 8(a) is a side view (partially a sectional view), FIG. 8(b) is a sectional view viewed along a line b-b in FIG. 8(a) and FIG. 8(c) shows action based upon FIG. 8(b).

As shown in FIG. 8(a), the swinging mechanism 93 is a so-called Neidhart damper composed of a case 111 attached to the rear end inclined part 32B of the J frame 32 and the rear of the L pipe 54, damper rubbers 112, housed in the case 111, a pressing member 113 attached to the connecting member 92 for pressing these damper rubbers 112, an end supporting part 114 which is pierced by the pressing member 113 and the connecting member 92 and both ends of which are provided to the L pipe 54 and a through pin 116 supported by the rear end inclined part 32B. A fitting 117 is provided to the pressing member 113 for bolting the pressing member 113 on the connecting member 92. A swing regulating part 118 is integrated with the end supporting part 114 to regulate an amount of the swing of the connecting member 92.

As shown in FIG. 8(b), the case 111 is a member in which a left case 121 and a right case 122 are combined with a damper housing 123 being provided inside, and damper rubbers 112 are arranged at the four corners of the damper housing 123. The damper rubbers 112 are pressed by convex pressing parts 124 of the pressing member 113.

As shown in FIG. 8(c), when the body frame 16 is oscillated on the left of the body (an arrow left in FIG. 8(c) shows the left of the body) for the connecting member 92 coupled to the side of the suspension arm and the L pipe 54 is inclined by an angle θ, the case 111 of the swinging mechanism 93 is relatively turned for the pressing member 113, the damper rubbers 112 housed in the case 111 are compressed between the case 111 and the pressing member 113, and a reaction force to try to return the case 111 relative to the body frame 16 back to the original position (the position shown in FIG. 8(a)) is caused.

Figure 9:
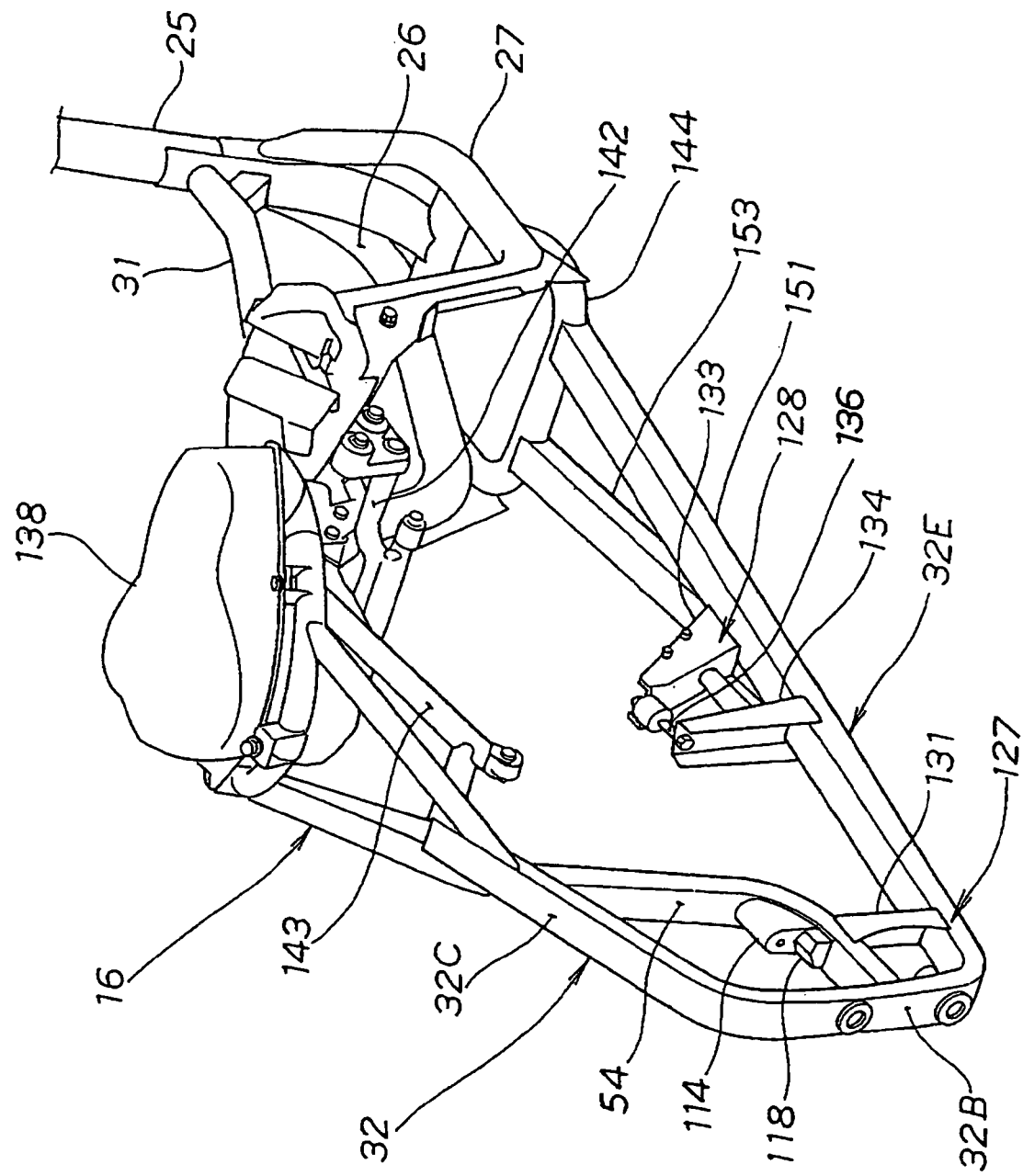
FIG. 9 is a third perspective view showing the three-wheeled vehicle according to the invention.

FIG. 9 is a perspective view showing the three-wheeled vehicle according to the present invention (showing the body frame diagonally viewed from the rear side) wherein a rear fitting 127 is provided for attaching the rear portions of the suspension arms 71, 72 (see FIG. 7) to the J frame 32 so that the suspension arms can swing and a front fitting 128 is provided for attaching the front portions of the suspension arms 71, 72 to the J frame so that the suspension arms can swing are provided.

The rear fitting 127 is composed of the rear end inclined part 32B and a vertical bracket 131 between the L pipe 54 and a lower horizontal part 32E (described later), and the rear swinging shaft (see FIG. 6) that supports the rear portions of the suspension arms 71, 72 is attached to the rear end inclined part 32B and the vertical bracket 131.

The front fitting 128 is composed of a front stand 133 and a rear stand 134 that respectively stand on the lower horizontal part 32E at an interval and a front swinging shaft 136 that supports the fronts of the suspension arms 71, 72 is attached to the front stand 133 and the rear stand 134.

A fuel tank 138 is provided together with an engine mounting vibration isolating link 142, 143 for mounting the engine 34 on the body frame 16. A U-shaped pipe 144 is attached to the lower part of each rear portion of the lower pipes 26, 27 to attach the end of the lower horizontal part 32E of the J frame 32.

In FIG. 5, illustrates the embodiment wherein the front end of the lower horizontal part 32A is branched in a Y-shape and is directly attached to the lower pipes 26, 27. However, in FIG. 9, illustrates another embodiment in which the J frame 32 is composed of the lower horizontal part 32E branched in Y-shape with the rear end inclined part 32B and an upper inclined part 32C and the front end of the lower horizontal part 32E is attached to the lower pipes 26, 27 via the U pipe 144.

Figure 10:
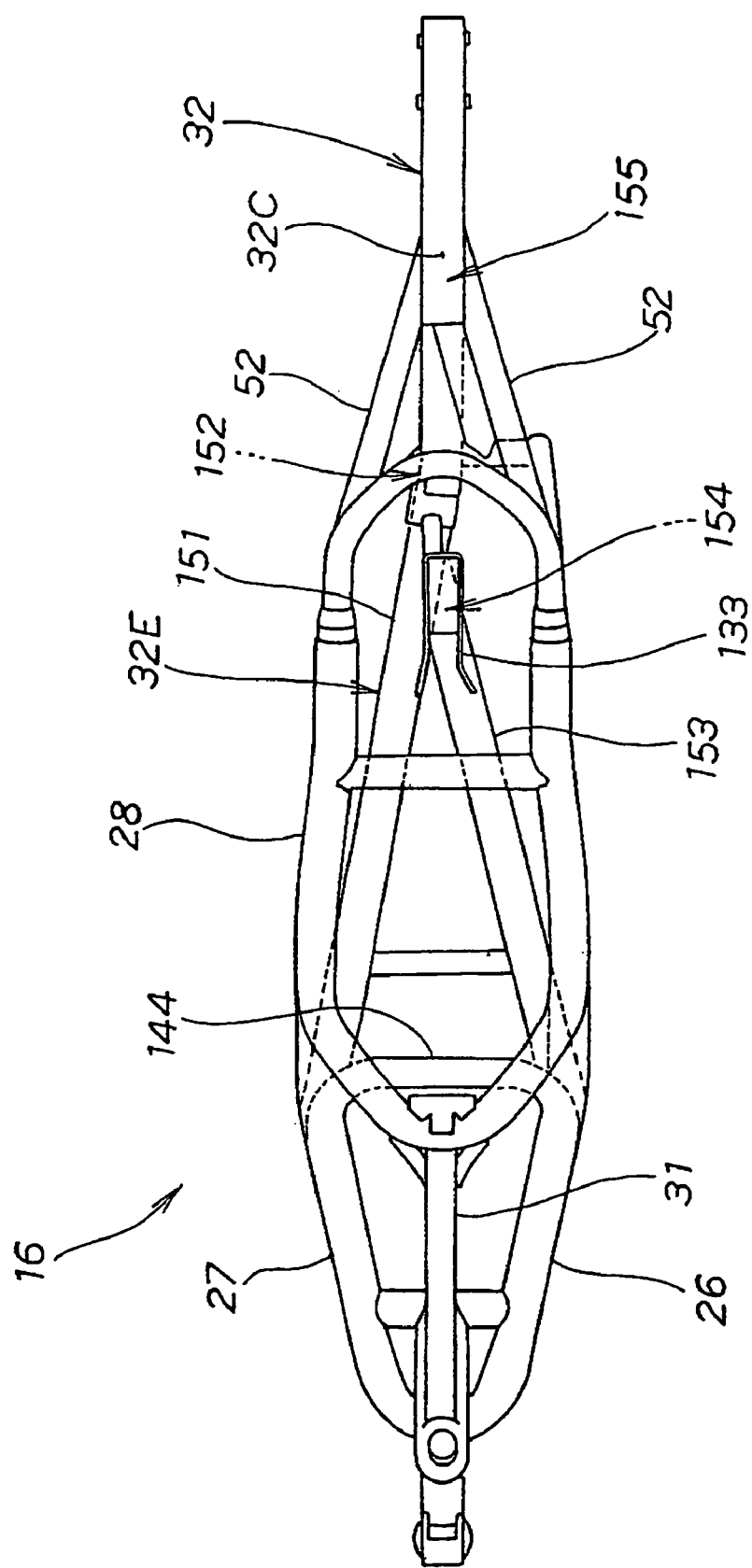
FIG. 10 is a plan showing a body frame according to the invention.

FIG. 10 is a plan view showing the body frame according to the present invention and illustrating the lower horizontal part 32E of the J frame 32 that is branched in a Y-shape halfway and is coupled to the rear of the U-shaped pipe 144 and the coupling pipes 52, 52 extend from the upper inclined part 32C of the J frame 32 to the center upper frame 28 in Y type.

The lower horizontal part 32E (and the lower horizontal part 32A (see FIG. 5) are detailedly a part formed by bending one long first pipe 151 halfway and connecting a second pipe 153 in the vicinity of a bend 152 of the first pipe 151. A Y-shaped branched part 154 is branched in Y-shape by connecting the second pipe 153 to the first pipe 151. A Y-shaped branched part 155 is branched in a Y-shape by connecting the coupling pipes 52, 52 to the upper inclined part 32C.

The first pipe 151 is a member including the rear end inclined part 32B and the upper inclined part 32C and is equivalent to a part acquired by subtracting the second pipe 153 from the J frame 32.

As described above, the connection of the front of the lower part of the J frame 32 and the U-shaped pipe 144 can be strengthened by forming the lower horizontal part 32E in Y-shape, and the connection of the upper part of the rear of the J frame 32 and the rear of the center upper frame 28 can be strengthened by arranging the coupling pipes 52, 52 in a Y-shape. In addition, the connection of the front of the lower part of the J frame 32 and the lower pipes 26, 27 can be strengthened by forming the lower horizontal part 32A in Y type as shown in FIG. 5.

Figure 11:
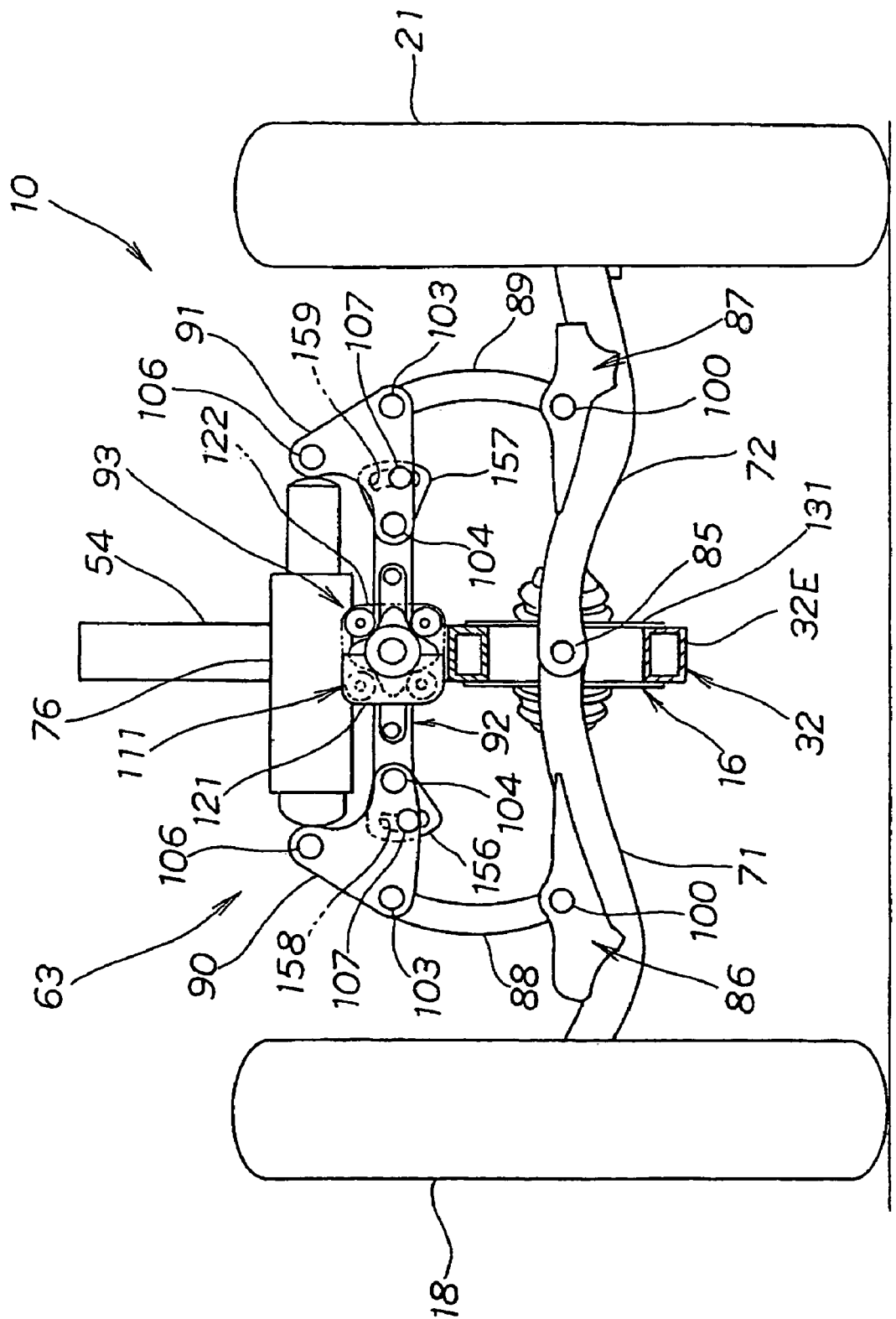
FIG. 11 is a back view showing a rear suspension according to the invention.

FIG. 11 is a back view showing the rear suspension according to the present invention and illustrating the rear suspension 63 in a state in which one rider (driver) rides. However, the rear end inclined part 32B and the upper inclined part 32C of the J frame 32 respectively shown in FIG. 9 are omitted. The right case 122 shown in FIG. 8(b) of the swinging mechanism 93 is shown by an imaginary line. At this time, the L pipe 54 of the body frame 16 is substantially vertical and the connecting member 92 is substantially horizontal.

The connecting member 92 is a member provided with fan-type parts 156, 157 at both ends and provided with circular arc-shaped long holes 158, 159 in these fan-type parts 156, 157, and an angle of the inclination of the bell cranks 90, 91 with the connecting member 92 is regulated by inserting each fourth bolt 107, 107 that functions as a stopper pin into each circular arc-shaped long hole 158, 159. The angle of the inclination of the bell cranks 90, 91 varies depending upon an angle of the inclination of the suspension arms 71, 72. More specifically, by an amount of the vertical motion of the rear wheels 18, 21. In other words, the circular arc-shaped long holes 158, 159 are parts for regulating the amount of the vertical motion of the rear wheels 18, 21.

Figure 12:
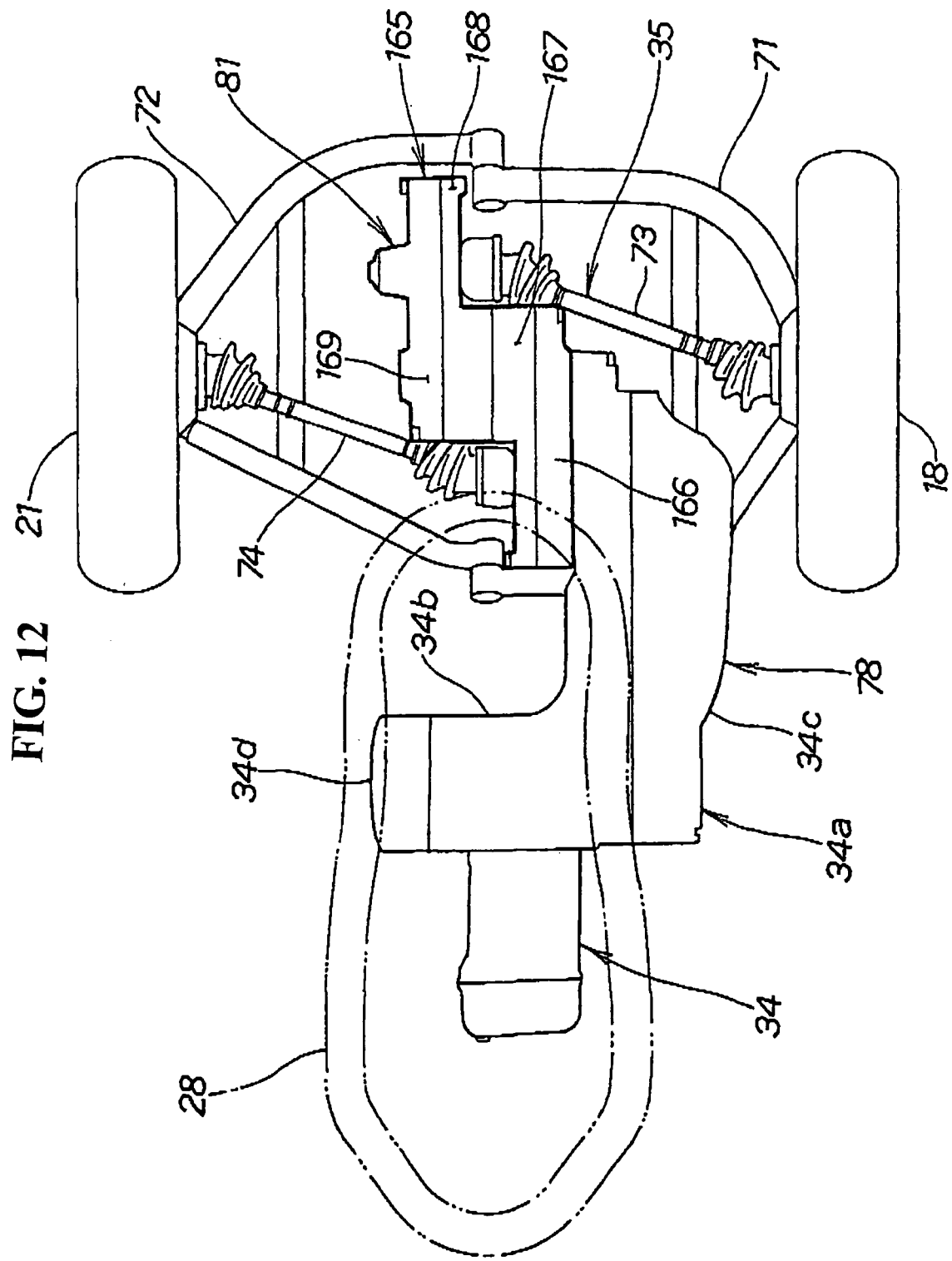
FIG. 12 is a plan showing a main part of a power transmission mechanism according to the invention.

FIG. 12 is a plan view showing a main part of the power transmission mechanism according to the present invention and illustrating the power transmission mechanism 35 in which the continuously variable transmission 78 is housed in the rear of the crankcase 34a of the engine 34 and the gear box 81 which is separate from the crankcase 34a is attached to the rear of the crankcase 34a.

The crankcase 34a includes the body of the case 34b, a transmission cover 34c that covers the left side of the body of the case 34b and a right cover 34d that covers the right side of the body of the case 34b.

The gear box 81 is provided with a gear case 165 for housing plural gears and the gear case 165 includes a first case 166 to a fourth case 169.

Figure 13:
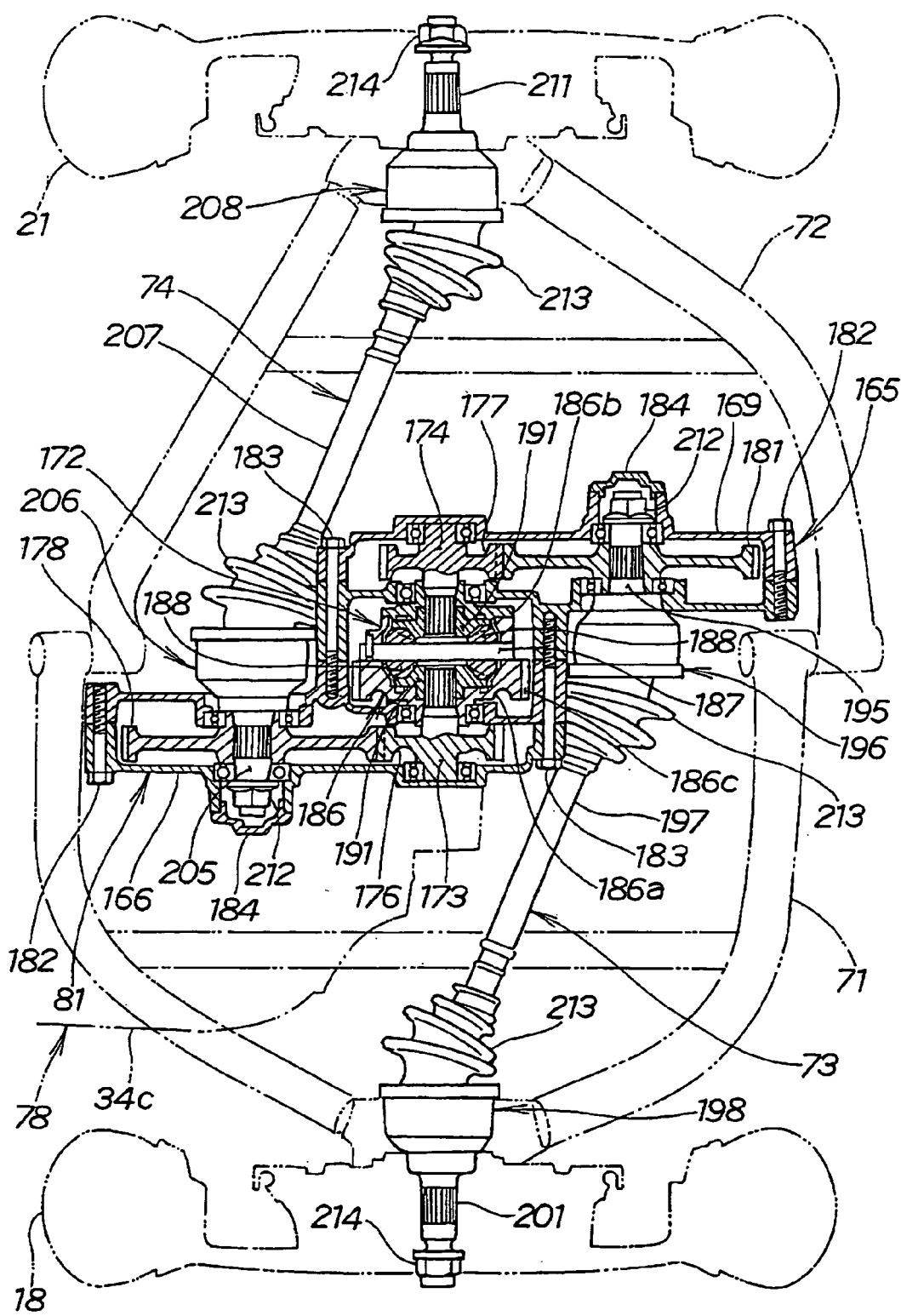
FIG. 13 is a sectional view for explaining a gear box according to the invention.

FIG. 13 is a sectional view for explaining the gear box according to the present invention. The gear box 81 is provided with a differential mechanism 172, a left first gear 176 and a right first gear 177 respectively integrated with a left differential shaft 173 and a right differential shaft 174 which are respectively an output shaft of the differential mechanism 172, a left second gear 178 and a right second gear 181 respectively engaged with the left first gear 176 and right first gear 177, the gear case 165, plural bearings and bolts 182 and 183 that connect each case of the gear case 165. A cap 184, 184 closes the openings of the first case 166 and the fourth case 169.

The differential mechanism 172 is composed of a case 186, a pin 187 attached to the case 186, a pair of first bevel gears 188, 188 attached to the pin 187 so that the pin can be turned, a pair of second bevel gears 191, 191 engaged with the first bevel gears 188, 188 and the left differential shaft 173 and the right differential shaft 174 engaged with the second bevel gears 191, 191 via splines.

The case 186 is composed of the body of the case 186a and a case cover 186b that closes the opening of the body of the case 186a, a large-diameter gear 186c that acquires power from the side of the continuously variable transmission 78 is provided within the body of the case 186a where the first bevel gears 188, 188 and the second bevel gears 191, 191 are housed.

The drive shaft 73 includes an inner shaft 195 as an output shaft engaged with the right second gear 181 via a spline, a center shaft 197 coupled to the inner shaft 195 via a constant-velocity universal joint 196 and an outer shaft 201 coupled to the end of the center shaft 197 via a constant-velocity universal joint 198 and engaged with a hub on the side of the rear wheel 18 via a spline.

The drive shaft 74 is composed of an inner shaft 205 as an output shaft engaged with the left second gear 178 via a spline, a center shaft 207 coupled to the inner shaft 205 via a constant-velocity universal joint 206 and an outer shaft 211 coupled to the end of the center shaft 207 via a constant-velocity universal joint 208 and engaged with a hub on the side of the rear wheel 21 via a spline. A nut 212, 212 is provided for fixing the inner shafts 195, 205 to the left second gear 178 and the right second gear 181. Rubber boots 213 are provided that respectively cover the constant-velocity universal joints 196, 198, 206, 208. A nut 214, 214 is provided for fixing each outer shaft 201, 211 to the hub.

The inner shaft 195 of the drive shaft 73 is the left output shaft of the gear box 81 and the inner shaft 205 of the drive shaft 74 is the right output shaft of the gear box 81.

As described above, in the present invention, the inner shafts 195, 205 are provided as the left and right output shafts of the gear box 81 apart in the longitudinal direction of the body.

Figure 14:
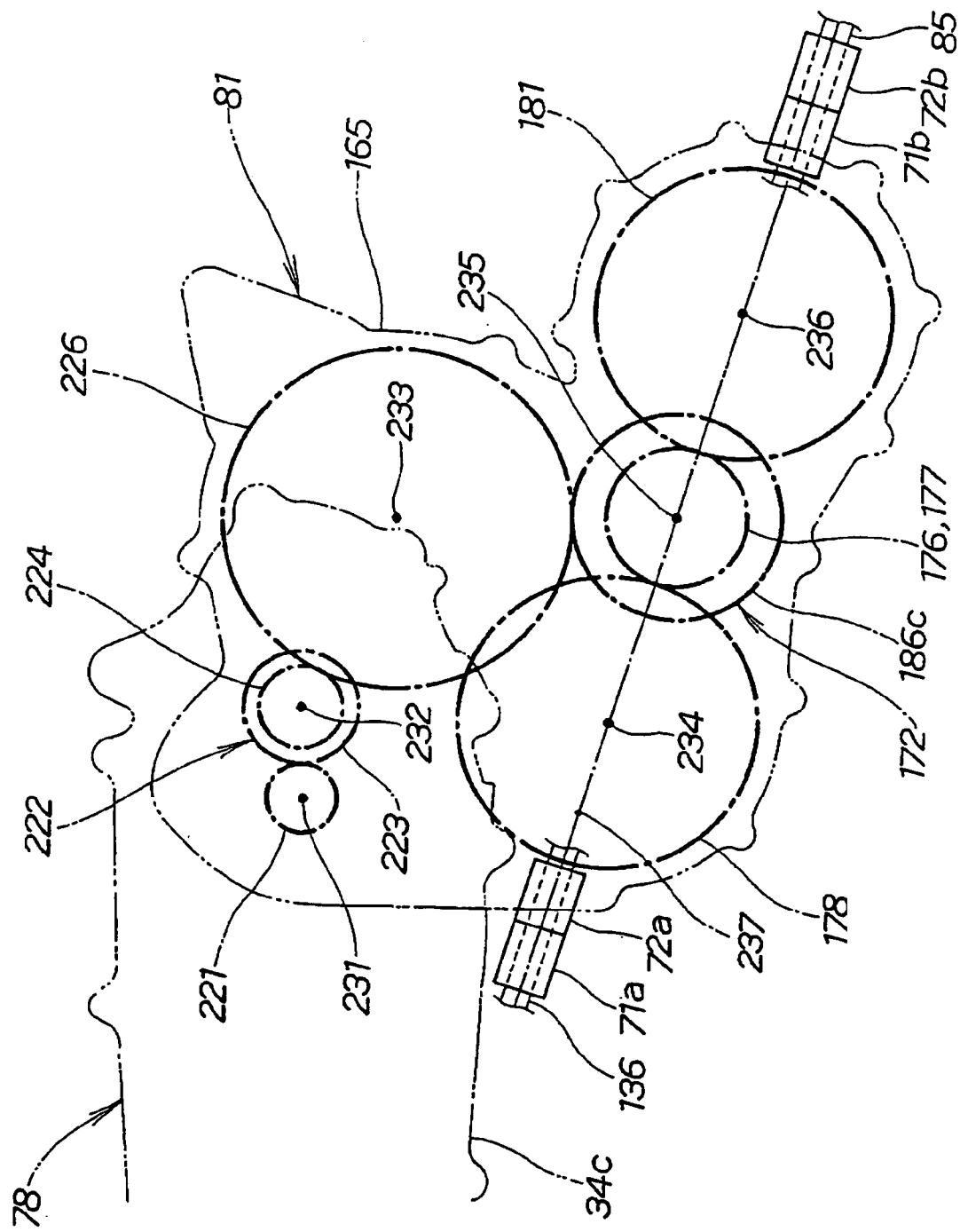
FIG. 14 is a side view showing a gear train of the gear box according to the invention.

FIG. 14 is a side view showing a gear train of the gear box according to the present invention. FIG. 14 also shows that a driving gear 221 is attached to the shaft of a pulley on the driven side of the belt continuously variable transmission 78. A large gear 223 forming a speed reducing gear 222 is engaged with the driving gear 221. A small gear 224 is integrated with the large gear 223 and is engaged with a transmission gear 226. The large-diameter gear 186c of the differential mechanism 172 is engaged with the transmission gear 226 with the left first gear 176 of the left differential shaft 173 (see FIG. 13) coaxial with the large-diameter gear 186c that is engaged with the left second gear 178. The right first gear 177 of the right differential shaft 174 (see FIG. 13) is coaxial with the large-diameter gear 186c and is similarly engaged with the right second gear 181 and the differential mechanism 172. More specifically, the left first gear 176 and the right first gear 177 are arranged below the continuously variable transmission 78. The centers 231 to 236 of the axis of each gear is also set forth in FIG. 14.

The driving gear 221, the speed reducing gear 222 and the transmission gear 226 are components forming a speed reducing mechanism 238.

That is, the gear box 81 is provided with the differential mechanism 172 and the speed reducing mechanism 238.

FIG. 14 also shows that the centers of the axis 234, 235, 236 are arranged on a straight line 237, the front swinging shaft 136 and the rear swinging shaft 85 are arranged on the straight line 237, the respective front fittings 71a, 72a of the suspension arms 71, 72 are attached to the front swinging shaft 136 so that the suspension arms can be turned and the respective rear fittings 71b, 72b of the suspension arms 71, 72 are attached to the rear swinging shaft 85 so that the suspension arms can be turned.

That is, FIG. 14 shows the front fittings 71a, 72a and the rear fittings 71b, 72b of the suspension arms 71, 72 are arranged before and after the differential mechanism 172.

Next, the action of the rear suspension 63 will be described.

Figure 15:
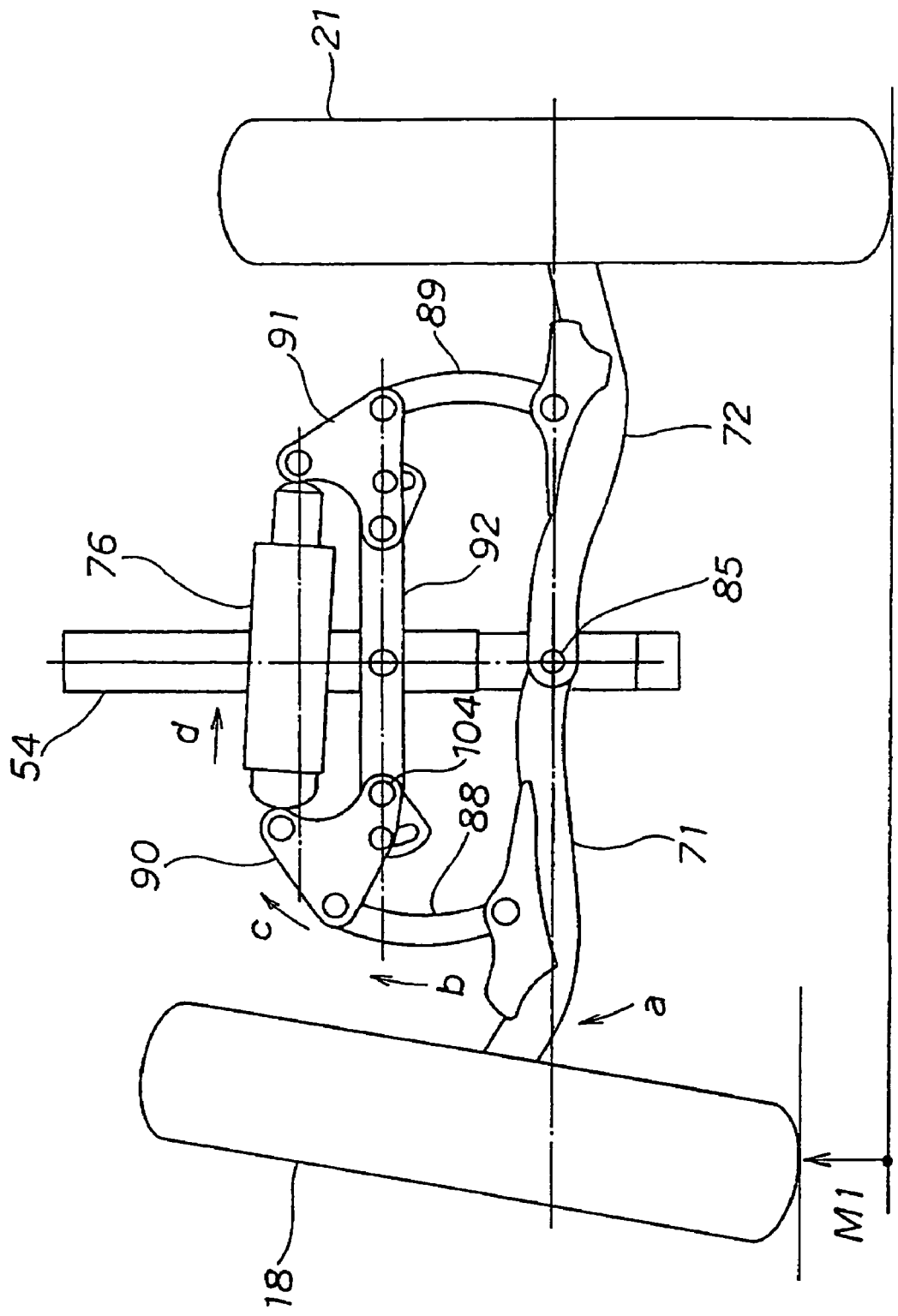
FIG. 15 is a first view showing the action of the rear suspension according to the invention.

FIG. 15 is a view showing the action of the rear suspension according to the present invention.

For example, when the left rear wheel 18 is moved upward by an amount of movement M1 from a state shown in FIG. 11, the suspension arm 71 is swung upwardly as shown by an arrow a with the rear swinging shaft 85 and the front swinging shaft 136 (see FIG. 9) in the center. As a result, the circular arc-shaped link 88 is lifted as shown by an arrow b, the bell crank 90 is swung in a direction shown by an arrow c with the second bolt 104 as a fulcrum and the shock absorber 76 is compressed as shown by an arrow d. Thereby, the transmission of shock caused by the lift of the left rear wheel 18 to the side of the body frame 16 (see FIG. 10) is dampened.

At this time, as the other suspension arm 72 is in the same state as a state shown in FIG. 11, the connecting member 92 is substantially horizontal as in FIG. 11.

Figure 16:
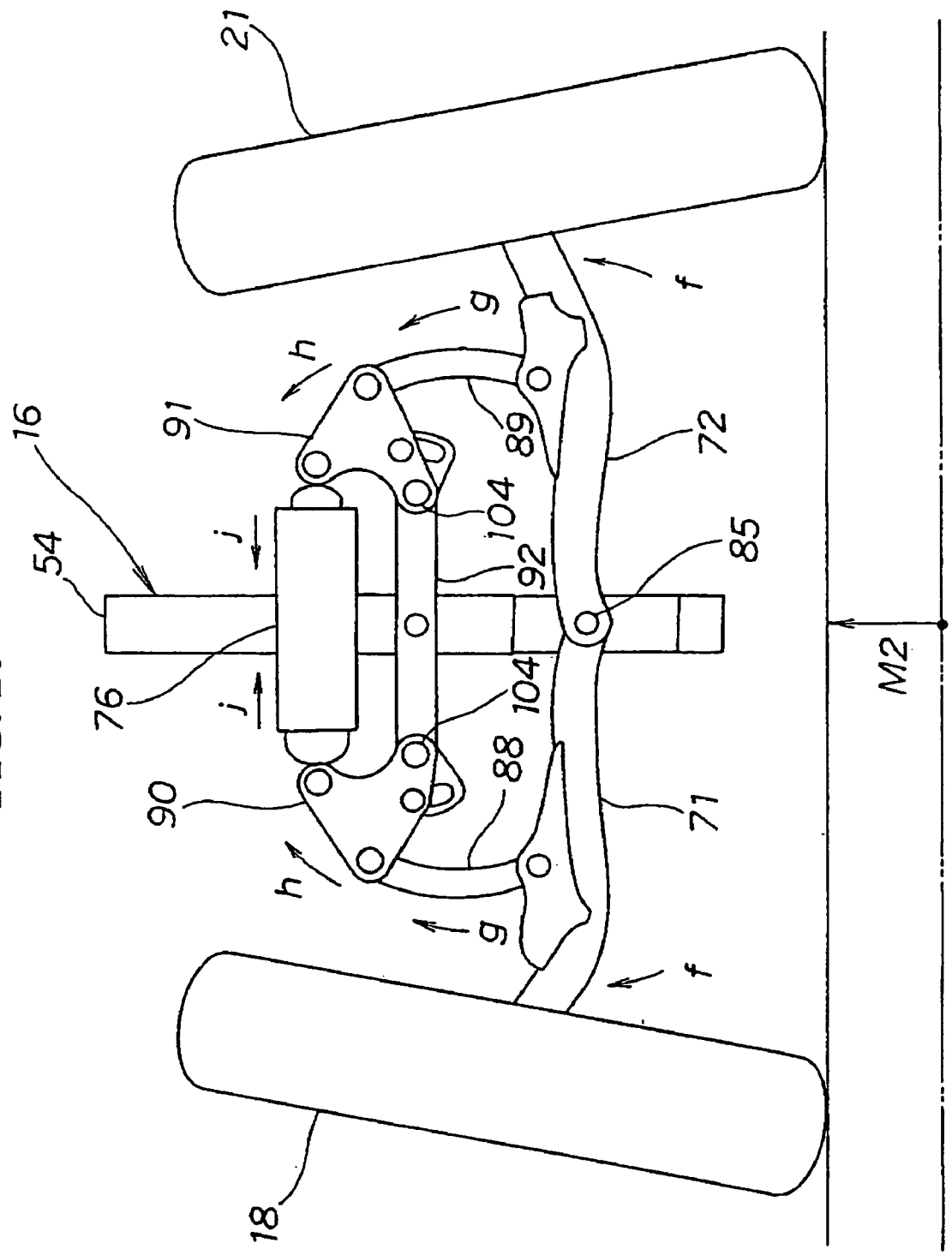
FIG. 16 is a second view showing the action of the rear suspension according to the invention.

FIG. 16 is a second view showing the action of the rear suspension according to the present invention.

When the rear wheels 18, 21 are both lifted by an amount of movement M2 or the body frame 16 is lowered for the rear wheels 18, 21 by the amount of movement M2 from the state shown in FIG. 11, the suspension arms 71, 72 are swung upwardly as shown by arrows f, f with the rear swinging shaft 85 and the front swinging shaft 136 (see FIG. 9) in the center. As a result, the circular arc-shaped links 88, 89 are lifted as shown by arrows g, g, the bell cranks 90, 91 are swung in a direction shown by arrows h, h with the second bolt 104 as a fulcrum and the shock absorber 76 is compressed as shown by arrows j, j. As a result, shock absorber action by the shock absorber 76 is performed.

Figure 17:
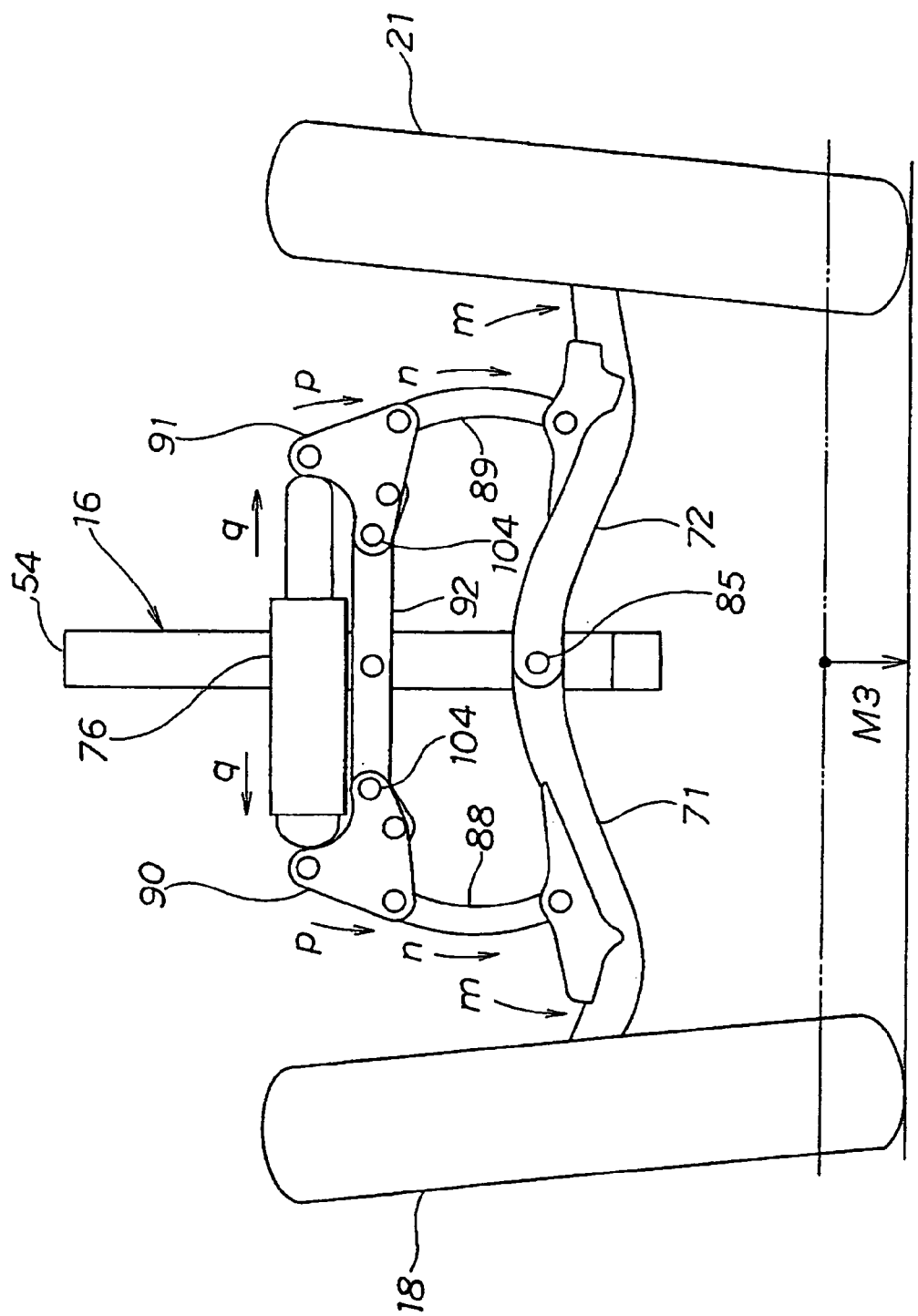
FIG. 17 is a third view showing the action of the rear suspension according to the invention.

FIG. 17 is a third view showing the action of the rear suspension according to the present invention.

When the rear wheels 18, 21 are both lowered by an amount of movement M3 or the body frame 16 is lifted for the rear wheels 18, 21 by the amount of movement M3 from the state shown in FIG. 11, the suspension arms 71, 72 are swung downward as shown by arrows m, m with the rear swinging shaft 85 and the front swinging shaft 136 (see FIG. 9) in the center. As a result, the circular arc-shaped links 88, 89 are lowered as shown by arrows n, n, the bell cranks 90, 91 are swung in a direction shown by arrows p, p with the second bolt 104 as a fulcrum and the shock absorber 76 is expanded as shown by arrows q, q. As a result, shock absorber action by the shock absorber 76 is performed.

Figure 18:
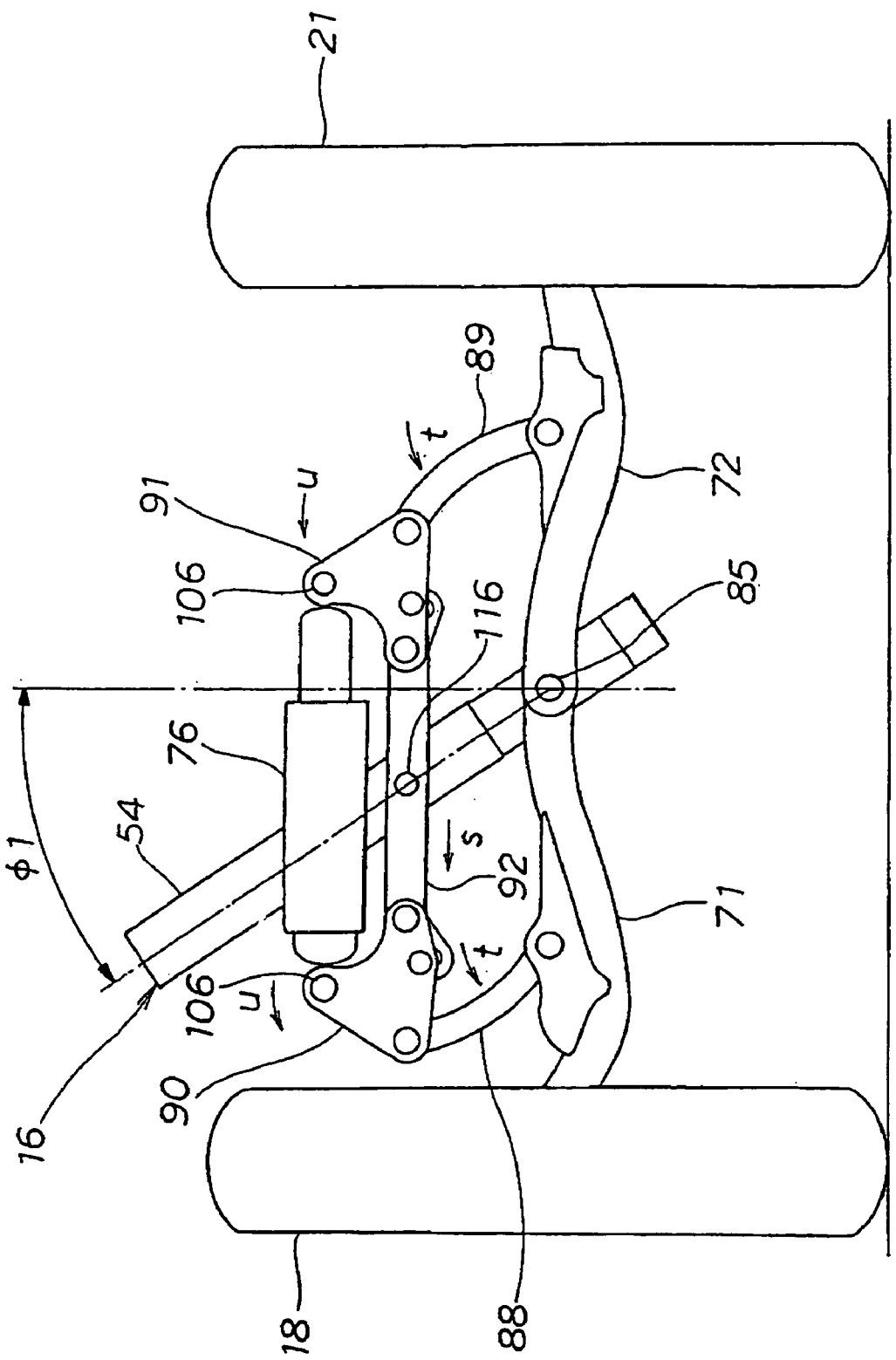
FIG. 18 is a fourth view showing the action of the rear suspension according to the invention.

FIG. 18 is a fourth view showing the action of the rear suspension according to the present invention.

When the body frame 16, the L pipe 54 in this case, is oscillated on the left of the body by an angle $\phi 1$ from the state shown in FIG. 11, the connecting member 92 coupled to the L pipe 54 by the through pin 116 is moved to the left in parallel as shown by an arrow s. As a result, the circular arc-shaped links 88, 89 are inclined as shown by arrows t, t and the bell cranks 90, 91 are moved in parallel as shown by arrows u, u. As an interval between the respective third bolts 106, 106 of the bell cranks 90, 91 does not vary, the shock absorber 76 is not expanded or contracted.

At this time, as the body frame 16 is oscillated for the connecting member 92, reaction force to try to return the body frame 16 to the original position (that is, the position shown in FIG. 11) by the swinging mechanism is caused as shown in FIG. 8(c).

Figure 19:
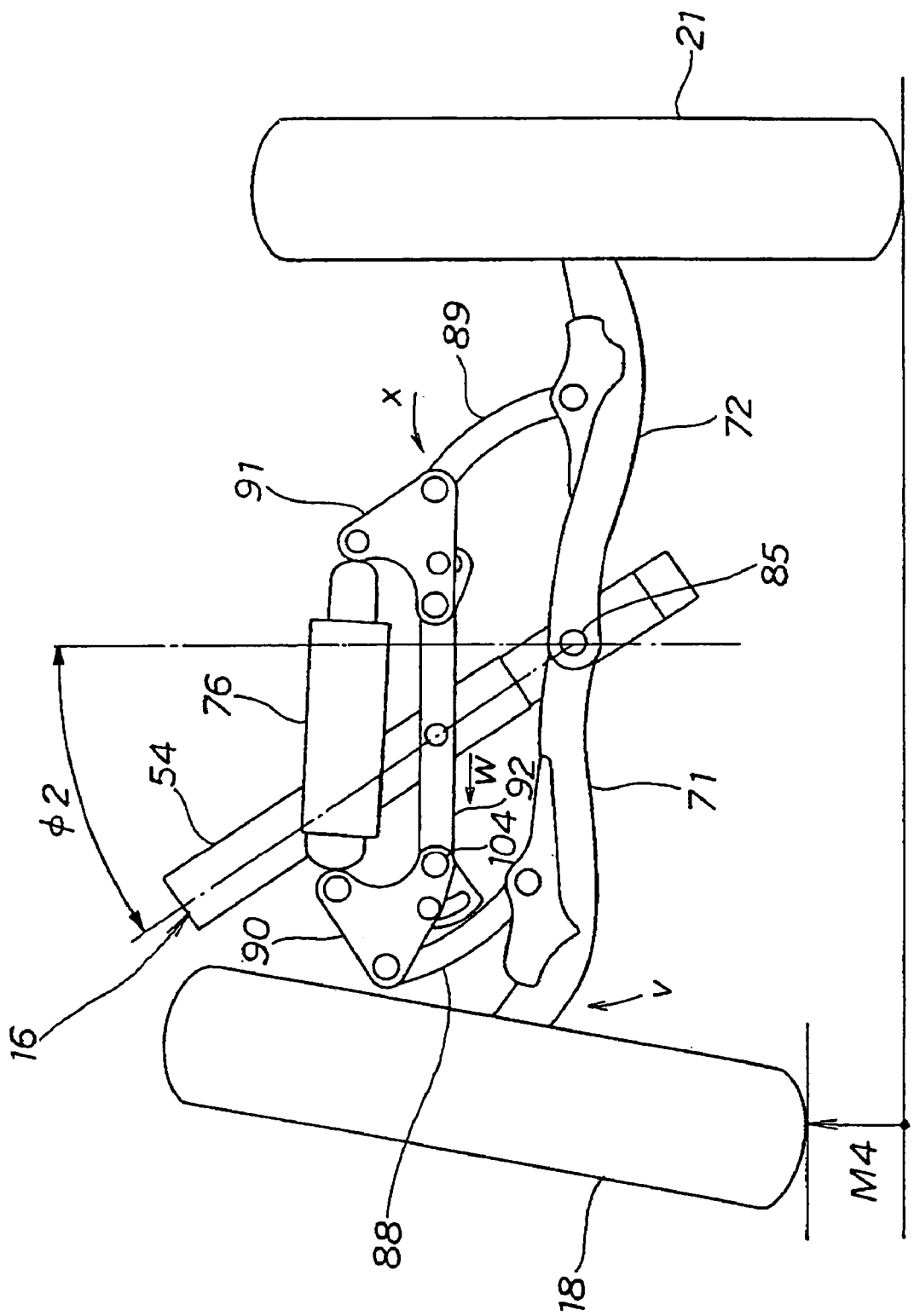
FIG. 19 is a fifth view showing the action of the rear suspension according to the invention.

FIG. 19 is a fifth view showing the action of the rear suspension according to the present invention.

When the rear wheel 18 is lifted by an amount of movement M4 and the body frame 16, the L pipe 54 in this case, is oscillated on the left of the body by an angle $\phi 2$ from the state shown in FIG. 11, the suspension arm 71 is swung upwardly as shown by an arrow v with the rear swinging shaft 85 and the front swinging shaft 136 (see FIG. 9) in the center and the connecting member 92 is moved to the left as shown by an arrow w. Thereby, the circular arc-shaped link 88 is lifted and is inclined to the left, the circular arc-shaped link 89 is inclined to the left as shown by an arrow x, the bell crank 90 is swung clockwise with the second bolt 104 as a fulcrum and is moved to the left, the bell crank 91 is moved to the left, as a result, the shock absorber 76 is compressed and performs a shock absorber action.

FIGS. 20(a) and 20(b) are back views for comparing the overall length of the drive shafts, FIG. 20(a) shows the embodiment (this embodiment) and FIG. 20(b) shows a comparison example.

In the embodiment shown in FIG. 20(a), one end of the drive shaft 73 is attached to the third and fourth cases 168, 169 provided to the right of the gear box 81 and one end of the drive shaft 74 is attached to the first and second cases 166, 167 provided to the left of the bear box 81. The circles represented by 'o' in FIG. 20(a) illustrate the constant-velocity universal joints 196, 198, 206, 208. Distance LL1 between the constant-velocity universal joints 196, 198 shall be the overall length of the drive shaft 73.

In the comparison example shown in FIG. 20(b), one end of a left drive shaft 352 is attached to the left of a gear box 351 and one end of a right drive shaft 353 is attached to the right of the gear box 351. The circles represented by 'o' in FIG. 20(b) shows constant-velocity universal joints 355, 356, 357, 358. Distance LL2 between the constant-velocity universal joints 355, 356 shall be the overall length of the left drive shaft 352. Rear wheels 361 and 362 are provided together with a suspension arm and are operatively connected to a body frame 365.

In FIGS. 20(a) and 20(b), LL1>LL2.

The action of the drive shafts 73, 74, the left drive shaft 352 and the right drive shaft 353 will be described below.

FIGS. 21(a) to 21(c) are views for explaining the action of the drive shaft (in the embodiment) according to the present invention.

As shown in FIG. 21(a), when the left rear wheel 18 is lifted upwardly by the amount of movement M1, the drive shaft 73 is bent in the constant-velocity universal joint 196 and an angle of the bend is $\alpha 1$.

As shown in FIG. 21(b), when the body frame 16 is oscillated on the left of the body by the angle $\phi 1$, the bear box 81 is oscillated together, the drive shaft 73 is bent in the constant-velocity universal joint 196 and an angle of the bend is $\alpha 2$.

As shown in FIG. 21(c), when the rear wheel 18 is lifted by an amount of movement M4 and the body frame 16 is oscillated on the left of the body by the angle $\phi 2$, the gear box 81 is also oscillated, the drive shaft 73 is bent in the constant-velocity universal joint 196 and an angle of the bend is $\alpha 3$. The angle $\alpha 3$ of the bend is within the tolerance of the bend of the constant-velocity universal joint 196.

Figure 22A:
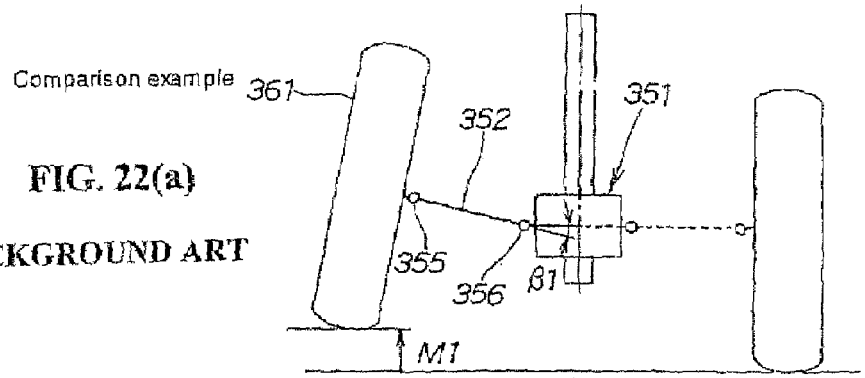
FIGS. 22(a) to 22(c) are explanatory drawings for explaining the action of the drive shafts in a comparison example.
Figure 22B:
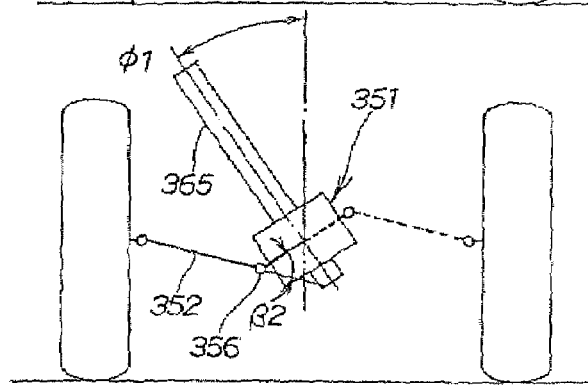
Figure 22C:
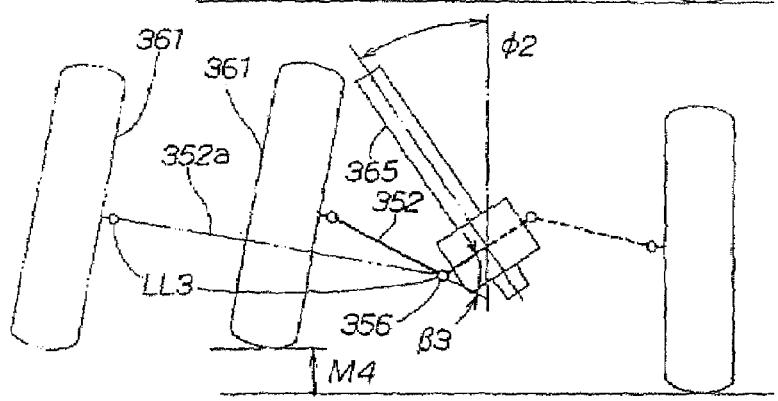
Figure 23:
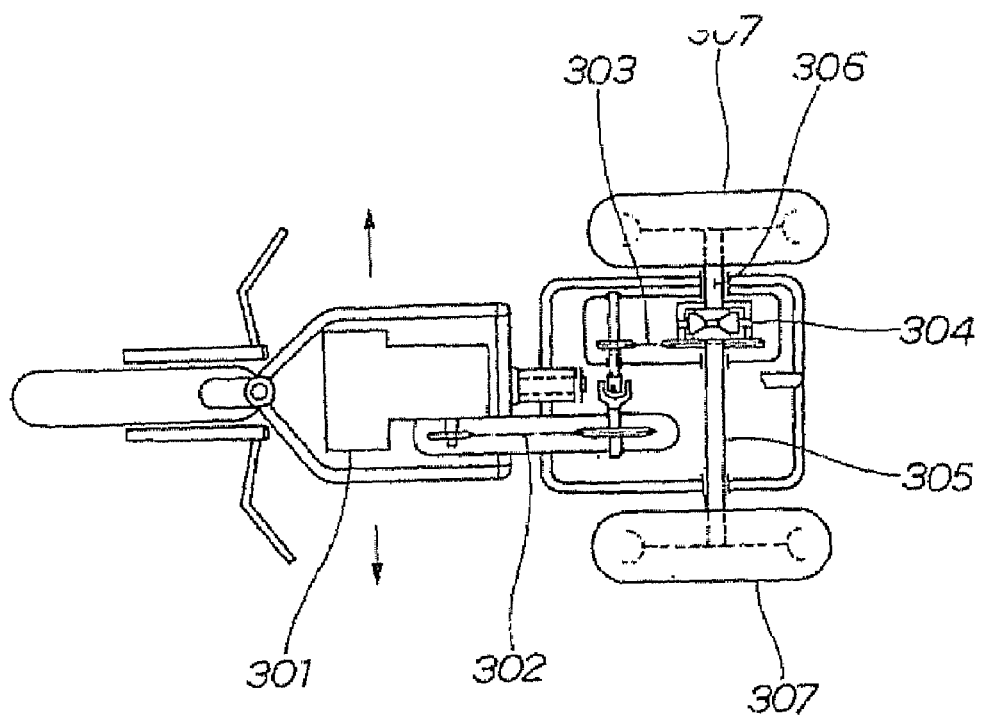
FIG. 23 is a plan showing a power transmission mechanism of a conventional type vehicle.
Figure 24:
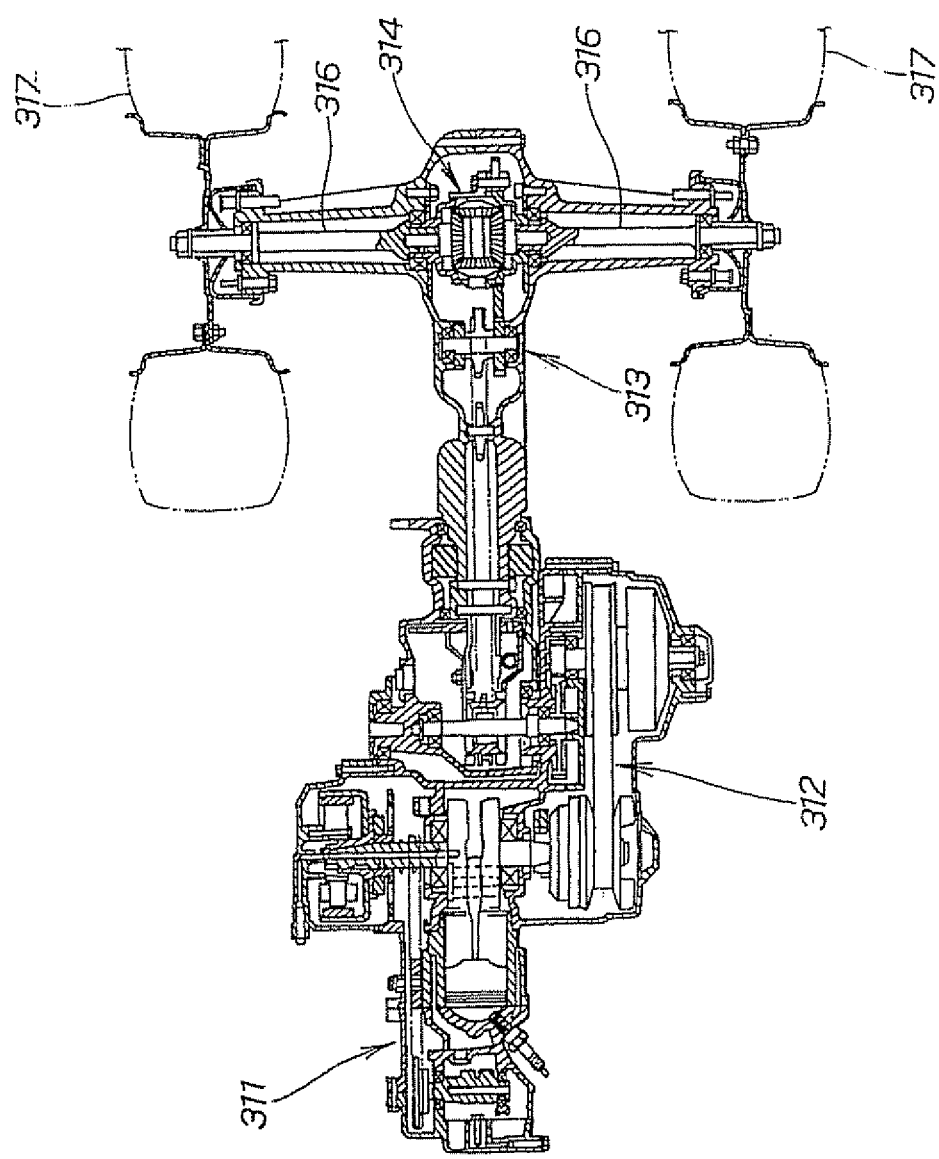
FIG. 24 is a sectional view showing the power transmission mechanism of the conventional type vehicle.
Figure 25:
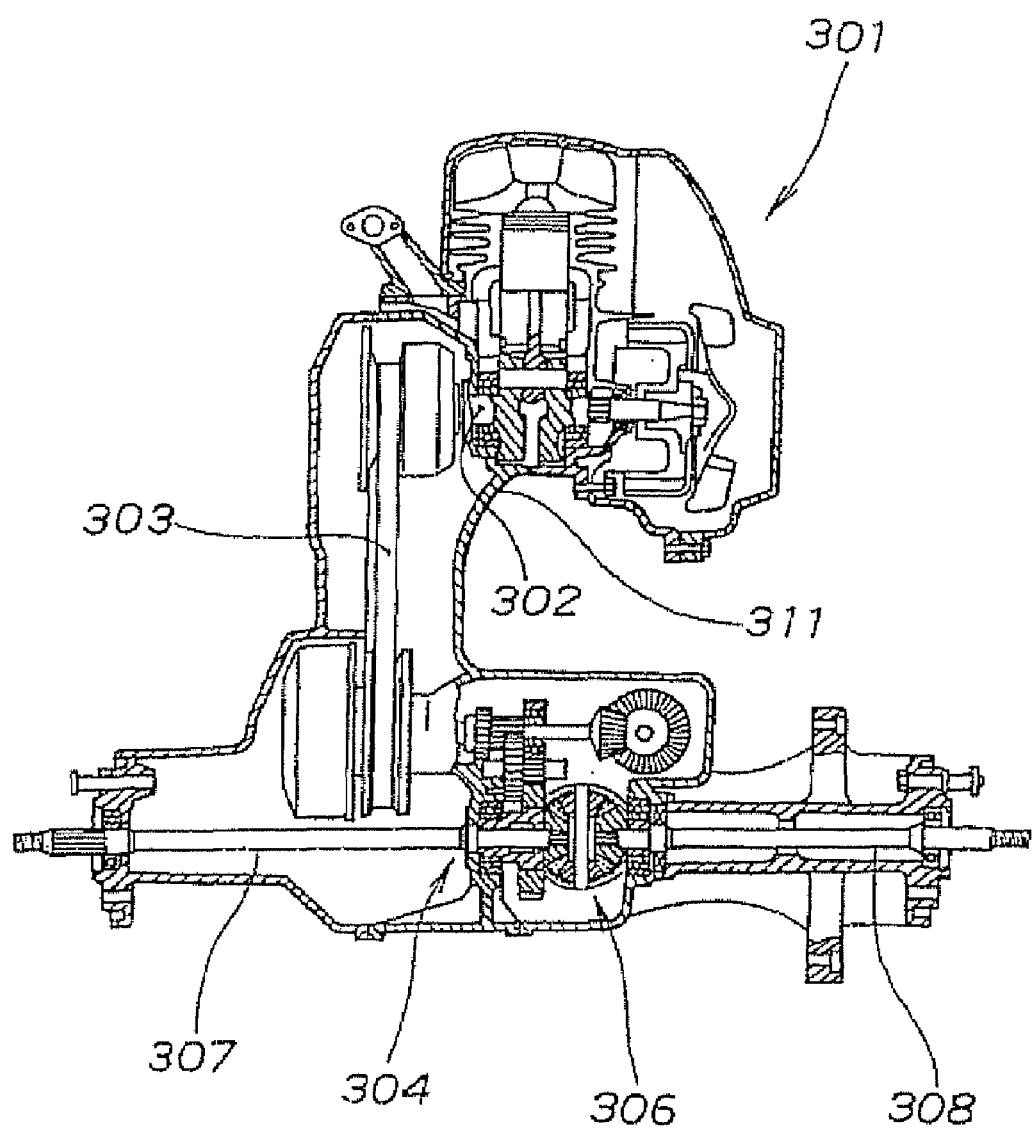
FIG. 25 is a sectional view showing the power transmission mechanism of the conventional type vehicle.

FIGS. 22(a) to 22(c) are views for explaining the action of the drive shaft in the comparison example.

As shown in FIG. 22(a), when the left rear wheel 361 is moved upwardly by the amount of movement M1, the left drive shaft 352 is bent in the constant-velocity universal joint 356 and an angle of the bend is $\beta 1$.

As shown in FIG. 22(b), when the body frame 365 is oscillated on the left of the body by the angle $\phi 1$, the gear box 351 is oscillated together, the drive shaft 352 is bent in the constant-velocity universal joint 356 and an angle of the bend is $\beta 2$.

As shown in FIG. 22(c), when the rear wheel 361 is lifted by the amount of movement M4 and the body frame 365 is oscillated on the left of the body by the angle $\phi 2$, the gear box 351 is also oscillated, the drive shaft 352 is bent in the constant-velocity universal joint 356 and an angle of the bend is $\beta 3$.

When the angle $\beta 3$ of the bend is compared with the angle $\alpha 3$ of the bend shown in FIG. 21(c), $\beta 3 > \alpha 3$.

To equalize the angle $\beta 3$ of the bend to the angle $\alpha 3$ of the bend, the overall length of a drive shaft (352a) is required to be increased up to LL3. That is, the width of the body is increased.

In the meantime, in the present invention, as described in relation to FIG. 13, as each position in which the drive shafts 73, 74 are respectively coupled to the gear box 81 is offset longitudinally for a line connecting the respective axles with the rear wheel 18 and the rear wheel 21 (that is, the inner shafts 195, 205), the drive shafts 73, 74 can be arranged diagonally in a direction of the width of the body and though the overall length of the drive shafts 73, 74 is increased, the tread of the rear wheels 18, 21 can be reduced.

As described in relation to FIGS. 12 and 13, the present invention is first characterized in that the inner shafts 195, 205 which are the output shafts of the gear box 81 are provided apart in the longitudinal direction of the body in the three-wheeled vehicle 10 (see FIG. 3) provided with the power transmission mechanism 35 that transmits the output of the engine to the left and right wheels 18, 21 via the continuously variable transmission 78, the gear box 81 and the inner shafts 195, 205 of the drive shafts 73, 74 as the left and right output shafts.

For example, compared with a case where an output shaft is directly provided to the right and the left of a gear box, drive shafts extend straight right and left from these output shafts and a wheel is coupled to each end of the drive shafts. In the present invention, the left and right inner shafts 195, 205 are provided apart in the longitudinal direction of the body, if the drive shafts 73, 74 diagonally extend from the inner shafts 195, 205 to the sides of the rear wheels 18, 21, the overall length of the drive shafts 73, 74 can be increased and when the rear wheels 18, 21 are vertically moved, the angle of the bend of the drive shafts 73, 74 can be minimized. Further, as the drive shafts 73, 74 are diagonally extended even if the overall length is large, the tread of the rear wheels 18, 21 can be reduced.

Therefore, the width of the body can be reduced and the mobility of the three-wheeled vehicle 10 can be enhanced.

The present invention is second characterized in that the differential mechanism 172 is built in the gear box 81 and is arranged between the inner shafts 194,205.

The left differential shafts 173 and the right differential shaft 174 as two shafts on the output side of the differential mechanism 172 can be easily connected to the left and right inner shafts 195, 205 via the gear and others. Therefore, the cost of the gear box 81 can be reduced.

The present invention produces the following effect by the above-mentioned configuration.

In the power transmission mechanism of the vehicle, as the right and left output shafts of the reduction gear are provided apart in the longitudinal direction of the body, the overall length of the drive shaft can be increased and when the rear wheel is vertically moved, the angle of the bend of the drive shaft can be minimized. Further, as the drive shaft is diagonally extended, even if the overall length is large, the tread of the wheels can be reduced. Therefore, the width of the body can be reduced and the mobility of the vehicle can be enhanced.

In the power transmission mechanism of the vehicle, as the differential mechanism is built in the reduction gear and is arranged between the right and left output shafts, the two shafts on the output side of the differential mechanism can be easily connected to the right and left output shafts via the gear and others. Therefore, the cost of the reduction gear can be reduced.

As described in relation to FIGS. 12 and 14, the present invention is directed to a gear case 165 that is separate from the crankcase 34a and is attached to the crankcase 34a and the differential mechanism 172 and is housed in the separate gear case 165 in the three-wheeled vehicle 10 (see FIG. 3) provided with the swinging mechanism in which the continuously variable transmission 78 is housed in the crankcase 34a of the engine 34 and the output of the continuously variable transmission 78 is coupled to left and right rear wheels 18, 21 via the differential mechanism 172 in the gear box 81.

For example, a unit produced massively for a motorcycle is used for the engine 34 and the continuously variable transmission 78 by attaching the gear case 165 separate from the crankcase 34a to the crankcase 34a housing the transmission 78 and housing the differential mechanism 172 in the separate gear case 165, the differential mechanism 172 for a three-wheeled vehicle can be coupled to the unit, and the unit of the engine 34 of the power transmission mechanism 35 and the continuously variable transmission 78 can be easily applied. Therefore, the cost can be greatly reduced by mounting the massively produced unit in the three-wheeled vehicle provided with the swinging mechanism 10.

Besides, as the speed reducing mechanism 238 is housed together with the differential mechanism 78 in the gear case 165, the gear box 81 for a three-wheeled vehicle can be variously exchanged, applying the engine 34 and the continuously variable transmission 78 respectively for a motorcycle, and the speed reducing ratio of the speed reducing mechanism 238 of the gear box 81 can be freely set according to a type. The unit for a motorcycle of the engine 34 and the continuously variable transmission 78 may be also coupled to a gear box for a four-wheeled vehicle.

The present invention produces the following effect by the above-mentioned configuration.

In the power transmission mechanism of the vehicle, as the case is separate from the crankcase and is attached to the crankcase and the differential mechanism and is housed in the separate case, a differential mechanism for a three-wheeled vehicle or a fourth-wheeled vehicle can be coupled to the unit for a motorcycle of the engine and the transmission for example and the power transmission mechanism can be easily applied. Therefore, the cost can be greatly reduced.

In addition, in the case, for example wherein a speed reducing mechanism is housed together with the differential mechanism in the case, the speed reducing ratio of the speed reducing mechanism for a three-wheeled vehicle or a fourth-wheeled vehicle can be freely set according to a type, applying the engine and the transmission, respectively, for a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power transmission mechanism for a vehicle for transmitting the output of an engine to right and left wheels via a transmission comprising:
   a reduction gear including a plurality of gears each having an axis on a common plane; and
   right and left output shafts;
   wherein the right and left output shafts are provided apart in a longitudinal direction of a vehicle body,
   the right output shaft being operatively connected to the reduction gear via one constant-velocity universal joint,
   the left output shaft being operatively connected to the reduction gear via another constant-velocity universal joint, and
   the two constant-velocity universal joints overlapping each other in the longitudinal direction of the vehicle body.

2. The power transmission mechanism for a vehicle according to claim 1, wherein:
   said reduction gear includes a differential mechanism; and
   the differential mechanism is arranged between the right and left output shafts.

3. The power transmission mechanism for a vehicle according to claim 1, wherein the transmission mechanism includes a belt continuously variable transmission extending rearwardly from the engine.

4. The power transmission mechanism for a vehicle according to claim 1, wherein one of the right and left output shafts is operatively connected to a forward side of said reduction gear and the other of said left and right output shafts is operatively connected to a rear side of said reduction gear.

5. The power transmission mechanism for a vehicle according to claim 1, wherein a distal end of said right output shaft is operatively connected to a right suspension arm and a distal end of said left output shaft is operatively connected to a left suspension arm and further including a shock absorber operatively positioned between said right and left suspension arms for absorbing shock therebetween.

6. The power transmission mechanism for a vehicle according to claim 5, and further including a left bell crank operatively connected to said left suspension arm and one end of said shock absorber and a right bell crank operatively connected to said right suspension arm and second end of said shock absorber for providing a swinging movement therebetween.

7. The power transmission mechanism for a vehicle according to claim 6, and further including a swinging mechanism operatively connected between said left and right bell crank and a body frame of the vehicle for allowing left and right oscillation of the body frame.

8. The power transmission mechanism for a vehicle according to claim 1, wherein the plurality of gears of the reduction gear includes a transmission gear operatively connected to a differential mechanism, and further including;
  a left second gear operatively connected to the differential mechanism and to the left output shaft, and
  a right second gear operatively connected to the differential mechanism and to the right output shaft,
  said left second gear and said right second gear being displaced to each side of the differential mechanism along the longitudinal direction of the vehicle body.

9. The power transmission mechanism for a vehicle according to claim 8, wherein the plurality of gears of the reduction gear further includes a left first gear operatively connected to the differential mechanism and connected to the left second gear and right first gear operatively connected to the differential mechanism and connected to the right second gear for supply rotation thereto.

10. The power transmission mechanism for a vehicle according to claim 1, further comprising:
  a case separate from the crankcase and being attached to the crankcase; and
  the differential mechanism is housed in the separate case.

11. A power transmission mechanism for a vehicle according to claim 10, wherein said case includes a central portion for housing the differential mechanism and left and right portions for housing drive mechanisms for imparting rotation to said left and right rear wheels.

12. A power transmission mechanism adapted for use on a vehicle for transmitting the output of an engine to right and left wheels via a transmission comprising:
  a reduction gear extending a predetermined distance along a longitudinal direction of a vehicle body, the reduction gear including a plurality of gears each having an axis on a common plane;
  a right output shaft operatively connected to a right side of the reduction gear and extending therefrom; and
  a left output shaft operatively connected to a left side of the reduction gear and extending therefrom;
  wherein the right and left output shafts gear are spaced a predetermined distance apart in a longitudinal direction of a vehicle body,
  the right output shaft being operatively connected to the right side of the reduction gear via one constant-velocity universal joint,
  the left output shaft being operatively connected to the left side of the reduction gear via another constant-velocity universal joint, and
  the two constant-velocity universal joints overlapping each other in the longitudinal direction of the vehicle body.

13. The power transmission mechanism for a vehicle according to claim 12, wherein:
  said reduction gear includes a differential mechanism; and
  the differential mechanism is arranged between the right and left output shafts.

14. The power transmission mechanism for a vehicle according to claim 12, wherein the transmission mechanism includes a belt continuously variable transmission extending rearwardly from the engine.

15. The power transmission mechanism for a vehicle according to claim 12, wherein one of the right and left output shafts is operatively connected to a forward side of said reduction gear and the other of said left and right output shafts is operatively connected to a rear side of said reduction gear.

16. The power transmission mechanism for a vehicle according to claim 12, wherein a distal end of said right output shaft is operatively connected to a right suspension arm and a distal end of said left output shaft is operatively connected to a left suspension arm and further including a shock absorber operatively positioned between said right and left suspension arms for absorbing shock therebetween.

17. The power transmission mechanism for a vehicle according to claim 16, and further including a left bell crank operatively connected to said left suspension arm and one end of said shock absorber and a right bell crank operatively connected to said right suspension arm and second end of said shock absorber for providing a swinging movement therebetween.

18. The power transmission mechanism for a vehicle according to claim 17, and further including a swinging mechanism operatively connected between said left and right bell crank and a body frame of the vehicle for allowing left and right oscillation of the body frame.

19. The power transmission mechanism for a vehicle according to claim 12, wherein the plurality of gears of the reduction gear includes a transmission gear operatively connected to a differential mechanism, and further including;
  a left second gear operatively connected to the differential mechanism and to the left output shaft, and
  a right second gear operatively connected to the differential mechanism and to the right output shaft,
  said left second gear and said right second gear being displaced to each side of the differential mechanism along the longitudinal direction of the vehicle body.

20. The power transmission mechanism for a vehicle according to claim 19, wherein the plurality of gears of the reduction gear further includes a left first gear operatively connected to the differential mechanism and connected to the left second gear and right first gear operatively connected to the differential mechanism and connected to the right second gear for supply rotation thereto.

* * * * *